United States Patent
Brown et al.

(10) Patent No.: US 8,359,415 B2
(45) Date of Patent: Jan. 22, 2013

(54) MULTI-ROOT I/O VIRTUALIZATION USING SEPARATE MANAGEMENT FACILITIES OF MULTIPLE LOGICAL PARTITIONS

(75) Inventors: Aaron C. Brown, Austin, TX (US); Douglas M. Freimuth, New York, NY (US); Renato J. Recio, Austin, TX (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 12/114,989

(22) Filed: May 5, 2008

(65) Prior Publication Data

US 2009/0276773 A1 Nov. 5, 2009

(51) Int. Cl.
*G06F 13/12* (2006.01)
*G06F 13/20* (2006.01)
*G06F 13/36* (2006.01)

(52) U.S. Cl. ........... 710/62; 710/313; 710/314; 710/315
(58) Field of Classification Search .................. None
See application file for complete search history.

(56) References Cited

U.S. PATENT DOCUMENTS

| | | | |
|---|---|---|---|
| 6,247,080 B1 * | 6/2001 | Wallach et al. | 710/302 |
| 6,842,857 B2 * | 1/2005 | Lee et al. | 713/2 |
| 7,287,114 B2 * | 10/2007 | Sullivan | 710/316 |
| 7,480,742 B2 * | 1/2009 | Arndt et al. | 710/8 |
| 7,530,071 B2 | 5/2009 | Billau et al. | |
| 7,543,084 B2 * | 6/2009 | Arndt et al. | 710/8 |
| 7,613,847 B2 | 11/2009 | Kjos et al. | |
| 7,650,275 B2 * | 1/2010 | Herrell et al. | 703/25 |
| 7,694,047 B1 | 4/2010 | Alston | |
| 7,743,189 B2 * | 6/2010 | Brown et al. | 710/104 |
| 7,796,646 B2 * | 9/2010 | Das et al. | 370/474 |
| 7,870,301 B2 * | 1/2011 | Arndt et al. | 710/8 |
| 7,941,803 B2 * | 5/2011 | Armstrong et al. | 718/1 |
| 8,141,092 B2 * | 3/2012 | Brown et al. | 718/104 |
| 8,141,093 B2 * | 3/2012 | Brown et al. | 718/104 |
| 8,141,094 B2 * | 3/2012 | Brown et al. | 718/104 |
| 2002/0152371 A1 * | 10/2002 | Lee et al. | 713/2 |
| 2003/0005068 A1 * | 1/2003 | Nickel et al. | 709/208 |
| 2003/0051021 A1 * | 3/2003 | Hirschfeld et al. | 709/223 |
| 2004/0003063 A1 | 1/2004 | Ashok et al. | |
| 2004/0158834 A1 | 8/2004 | Ham et al. | |
| 2004/0181625 A1 | 9/2004 | Armstrong et al. | |
| 2004/0210678 A1 * | 10/2004 | Pettey et al. | 710/1 |
| 2005/0005062 A1 * | 1/2005 | Liu et al. | 711/112 |
| 2005/0034027 A1 | 2/2005 | Hamilton et al. | |

(Continued)

OTHER PUBLICATIONS

U.S. Appl. No. 11/940,360, filed Nov. 15, 2007, Brown et al.

(Continued)

*Primary Examiner* — Henry Tsai
*Assistant Examiner* — Christopher Bartels
(74) *Attorney, Agent, or Firm* — Stephen J. Walder, Jr.; Matthew B. Talpis

(57) ABSTRACT

Mechanisms are provided for implementing a multi-root PCI manager (MR-PCIM) in a multi-root I/O virtualization management partition (MR-IMP) to control the shared functionality of an multi-root I/O virtualization (IOV) enabled switch fabric and multi-root IOV enabled I/O adapter (IOA) through the base functions (BF) of the switches and IOAs. A hypervisor provides device-independent facilities to the code running in the I/O Virtualization Management Partition (IMP), Multi-Root (MR)-IMP and client partitions. The MR-IMP may include device specific code without the hypervisor needing to sacrifice its size, robustness, and upgradeability. The hypervisor provides the virtual intermediary functionally for the sharing and control of the switch and IOA's control functions.

18 Claims, 19 Drawing Sheets

U.S. PATENT DOCUMENTS

| | | | |
|---|---|---|---|
| 2005/0071363 A1 | 3/2005 | Chen et al. | |
| 2005/0071446 A1 | 3/2005 | Graham et al. | |
| 2005/0071514 A1 | 3/2005 | Anderson et al. | |
| 2005/0114555 A1* | 5/2005 | Errickson et al. | 710/3 |
| 2005/0129040 A1* | 6/2005 | Kiel et al. | 370/412 |
| 2005/0149651 A1* | 7/2005 | Doak et al. | 710/52 |
| 2005/0182788 A1* | 8/2005 | Arndt et al. | 707/103 R |
| 2005/0198641 A1* | 9/2005 | Eilam et al. | 718/104 |
| 2005/0240932 A1 | 10/2005 | Billau et al. | |
| 2005/0246453 A1* | 11/2005 | Erlingsson et al. | 710/1 |
| 2005/0268047 A1* | 12/2005 | Aslot et al. | 711/147 |
| 2005/0268052 A1* | 12/2005 | Hepkin et al. | 711/159 |
| 2006/0085794 A1* | 4/2006 | Yokoyama | 718/100 |
| 2006/0123111 A1 | 6/2006 | Dea et al. | |
| 2006/0174087 A1* | 8/2006 | Hashimoto et al. | 711/173 |
| 2006/0195663 A1* | 8/2006 | Arndt et al. | 711/153 |
| 2006/0218322 A1* | 9/2006 | Hoese et al. | 710/62 |
| 2006/0218372 A1 | 9/2006 | Ward | |
| 2006/0221832 A1* | 10/2006 | Muller et al. | 370/235 |
| 2006/0236063 A1* | 10/2006 | Hausauer et al. | 711/170 |
| 2006/0239287 A1* | 10/2006 | Johnsen et al. | 370/412 |
| 2006/0242330 A1* | 10/2006 | Torudbakken et al. | 710/5 |
| 2006/0250945 A1 | 11/2006 | Fernandes et al. | |
| 2006/0281630 A1 | 12/2006 | Bailey et al. | |
| 2007/0011272 A1* | 1/2007 | Bakke et al. | 709/217 |
| 2007/0061441 A1 | 3/2007 | Landis et al. | |
| 2007/0067366 A1 | 3/2007 | Landis | |
| 2007/0174850 A1* | 7/2007 | El Zur | 719/321 |
| 2007/0192466 A1* | 8/2007 | Nahum | 709/223 |
| 2007/0192518 A1* | 8/2007 | Rupanagunta et al. | 710/62 |
| 2007/0244937 A1* | 10/2007 | Flynn et al. | 707/204 |
| 2008/0091746 A1* | 4/2008 | Hatasaki et al. | 707/204 |
| 2008/0133709 A1* | 6/2008 | Aloni et al. | 709/218 |
| 2008/0155169 A1* | 6/2008 | Hiltgen et al. | 711/6 |
| 2009/0006710 A1 | 1/2009 | Daniel et al. | |
| 2009/0113430 A1* | 4/2009 | Riley | 718/101 |
| 2009/0119087 A1* | 5/2009 | Ang et al. | 703/23 |
| 2009/0133016 A1 | 5/2009 | Brown et al. | |
| 2009/0133028 A1 | 5/2009 | Brown et al. | |
| 2009/0144731 A1 | 6/2009 | Brown et al. | |
| 2010/0146170 A1 | 6/2010 | Brown et al. | |
| 2010/0165874 A1 | 7/2010 | Brown et al. | |

OTHER PUBLICATIONS

U.S. Appl. No. 11/949,419, filed Dec. 3, 2007, Brown et al.
U.S. Appl. No. 11/940,357, filed Nov. 15, 2007, Brown et al.
Brown, Aaron C. et al., "Differentiating Blade Destination and Traffic Types in a Multi-Root PCIe Environment", U.S. Appl. No. 12/346,251, filed Dec. 30, 2008.
Brown, Aaron et al., "Differentiating Traffic Types in a Multi-Root PCI Express Environment", U.S. Appl. No. 12/330,578, filed Dec. 9, 2008.
U.S. Appl. No. 11/940,357, 2 pages.
U.S. Appl. No. 11/940,360, 2 pages.
U.S. Appl. No. 11/949,419, 2 pages.
U.S. Appl. No. 12/330,578, 1 page.
U.S. Appl. No. 12/346,251, 2 pages.
Office Action from China Patent Office dated Apr. 29, 2010 for Application No. 200810176301.4, 7 pages.
Final Office Action mailed Jan. 5, 2011 for U.S. Appl. No. 12/346,251; 21 pages.
Office Action mailed Jan. 3, 2011 for U.S. Appl. No. 12/114,989; 26 pages.
Preliminary Amendment filed with the USPTO on Nov. 17, 2010 for U.S. Appl. No. 12/114,989, 33 pages.
Appeal Brief filed with the USPTO on May 18, 2011 for U.S. Appl. No. 12/346,251, 29 pages.
Office Action mailed May 25, 2011 for U.S. Appl. No. 11/940,357; 53 pages.
Office Action mailed Jun. 2, 2011 for U.S. Appl. No. 11/940,360; 50 pages.
Office Action mailed Jun. 21, 2011 for U.S. Appl. No. 11/949,419; 49 pages.
Interview Summary dated Aug. 26, 2011 for U.S. Appl. No. 11/940,357; 16 pages.
Notice of Allowance mailed on Sep. 15, 2011 for U.S. Appl. No. 12/346,251; 16 pages.
Notice of Allowance mailed on Nov. 23, 2011 for U.S. Appl. No. 11/940,357; 11 pages.
Notice of Allowance mailed on Nov. 28, 2011 for U.S. Appl. No. 11/940,360; 12 pages.
Notice of Allowance mailed on Dec. 6, 2011 for U.S. Appl. No. 11/949,419; 22 pages.
Response to Office Action filed with the USPTO on Aug. 25, 2011 for U.S. Appl. No. 11/940,357, 36 pages.
Response to Office Action filed with the USPTO on Aug. 31, 2011 for U.S. Appl. No. 11/940,360, 36 pages.
Response to Office Action filed with the USPTO on Sep. 21, 2011 for U.S. Appl. No. 11/949,419, 31 pages.
Office Action mailed Aug. 16, 2010 for U.S. Appl. No. 12/346,251; 27 pages.
Response to Office Action filed with the USPTO on Nov. 5, 2010 for U.S. Appl. No. 12/346,251, 17 pages.

* cited by examiner

| CALL | USED BY CLIENT LPAR FOR VFs? | USED BY IMP LPAR? | USED BY MR-IMP LPAR? |
|---|---|---|---|
| 702 READ/WRITE I/O CONFIGURATION SPACE | YES | YES | YES |
| 704 RESET PF (AND ALL VFs ASSOCIATED WITH PF) | NO | YES | NO |
| 706 DISABLE VF | NO | YES | NO |
| 708 RESET VF | YES | NO | NO |
| 710 QUERY BF/PF/VF ERROR STATE | YES | YES | YES |
| 712 ENABLE PF/VF FOR LOAD AND STORE OPERATIONS | YES | YES | NO |
| 714 QUERY I/O FABRIC ERROR INFORMATION | YES | YES | YES |
| 716 QUERY INTERRUPT SOURCE | YES | YES | YES |
| 718 SETUP DMA TRANSLATION | YES | NO | NO |
| 720 ADD/REMOVE VF FROM LPAR USE | YES | NO | NO |
| 722 ADD/REMOVE PF FROM LPAR USE | NO | YES | NO |
| 724 ADD/REMOVE BF FROM LPAR USE | NO | NO | YES |

LPAR TO PLATFORM FIRMWARE CALLS 700

*FIG. 7*

FIG. 8

| FIG. 8A |
|---|
| FIG. 8B |

| | HMC REQUEST | TARGET OF REQUEST | RESPONSE |
|---|---|---|---|
| 802 | QUERY I/O FABRIC CONFIGURATION | HYPERVISOR | FOR MR FABRIC, DISCOVERS THAT THE FABRIC IS AN MR FABRIC AND REPORTS THAT TO THE MHC. FOR SR FABRIC CONFIGURATION, HYPERVISOR RETURNS INFORMATION ABOUT I/O THAT EXISTS AND CHARACTERISTICS OF THAT I/O (FOR EXAMPLE, NUMBER OF POSSIBLE VFs FOR EACH PF) |
| 803 | QUERY I/O FABRIC CONFIGURATION | MR-IMP | REQUEST MR FABRIC CONFIGURATION, INCLUDING BFs AND PFs |
| 804 | SET LPAR SR I/O CONFIGURATION | HYPERVISOR | HYPERVISOR ASSIGNS PFs TO IMP LPARs AND VFs TO CLIENT LPARs, AS DIRECTED, AND PASSES THAT INFORMATION TO PFW PRIOR TO BOOTING THE OS FOR THAT LPAR |
| 805 | SET MR FABRIC CONFIGURATION | MR-IMP | MR-PCIM SETS UP BFs TO ASSIGN PFs TO SPECIFIED I/O FABRIC CONFIGURATION |
| 806 | POWER UP/DOWN IOA | HYPERVISOR | HYPERVISOR TURNS ON OR OFF POWER TO AN ADAPTER, AS DIRECTED |
| 808 | DYNAMIC ADD OF BF/PF/VF | HYPERVISOR | HYPERVISOR SETS UP RESOURCES (FOR EXAMPLE, ADDRESS SPACE AND INTERRUPTS) FOR RECEIVING LPAR, EXPECTS FIRMWARE CALL FROM LPAR TO ADD BF/PF/VF |
| 809 | DYNAMIC ADD OF BF | MR-IMP | MR-IMP CALLS FIRMWARE TO ADD BF TO LPAR, ADDS BF TO FABRIC CONFIGURATION, INITIALIZES BF CONFIGURATION SPACE, DISCOVERS PFs ASSOCIATED WITH THE BF, REPORTS PF INFORMATION TO HMC |

TO FIG. 8B

FROM FIG. 8A

| | | |
|---|---|---|
| 810 DYNAMIC ADD OF PF | IMP | IMP CALLS FIRMWARE TO ADD PF TO LPAR, ADDS PF TO FABRIC CONFIGURATION, INITIALIZES PF CONFIGURATION SPACE, LOADS PF DEVICE DRIVER, ENABLES PF's IOV |
| 812 DYNAMIC ADD OF VF | CLIENT | CLIENT CALLS FIRMWARE TO ADD VF TO LPAR, ADDS VF TO OS's FABRIC CONFIGURATION, LOADS PF DEVICE DRIVER, INITIALIZES VF CONFIGURATION SPACE |
| 814 DYNAMIC REMOVE OF BF/PF/VF | HYPERVISOR | HYPERVISOR EXPECTS FIRMWARE CALL FROM LPAR(s) FOR BF/PF/VF RESOURCES, AND WHEN THE CALL IS MADE, REMOVES THE RESOURCES FROM THE LPAR (FOR EXAMPLE, ADDRESS SPACE, INTERRUPTS) |
| 816 DYNAMIC REMOVE OF VF | CLIENT | CLIENT STOPS USING VF, REQUESTS RESET OF VF, REMOVES DEVICE DRIVER FOR VF, REMOVES VF FROM ITS CONFIGURATION, CALLS FIRMWARE TO REMOVE VF FROM LPAR |
| 818 DYNAMIC REMOVE OF PF | IMP | IMP STOPS USING PF, RESETS PF, REMOVES DEVICE DRIVER FOR PF, REMOVES PF FROM ITS CONFIGURATION, CALLS FIRMWARE TO REMOVE PF FROM LPAR |
| 819 DYNAMIC REMOVE OF BF | MR-IMP | MR-IMP STOPS USING BF, REMOVES BF FROM ITS CONFIGURATION, CALLS FIRMWARE TO REMOVE BF FROM LPAR |
| 820 IOA SOUTH SIDE MANAGEMENT | IMP | IMP PASSES REQUEST TO PF DEVICE DRIVER TO CONTROL THE SOUTH SIDE MANAGEMENT FUNCTIONS OF THE IOA (e.g., SETTING A VF's NETWORK ADDRESS) |
| 822 QUERY PREVIOUS COMMAND COMPLETION AND STATUS | ANY | FOR A POLLED TYPE HMC INTERFACE, TARGET RETURNS ANY DATA FROM THE PREVIOUS COMMAND AND THE STATUS OF THE COMPLETION |
| 824 QUERY MR-PCIM STATUS | MR-IMP | USED TO DETERMINE IF MR-PCIM IS ALIVE AND WELL (THAT IS, OPERATING NORMALLY) |
| 826 SET NEW MR-PCIM MASTER | MR-IMP | ISSUED TO MASTER MR-PCIM (IN MR-IMP), IF NECESSARY, TO FORCE RELINQUISH OF AUTHORITY, ISSUED TO OTHER MR-PCIM TO FORCE TAKE-OVER OF MR-PCIM RESPONSIBILITIES, INCLUDING PASSING NECESSARY DATA STRUCTURE TO THE NEW MASTER |

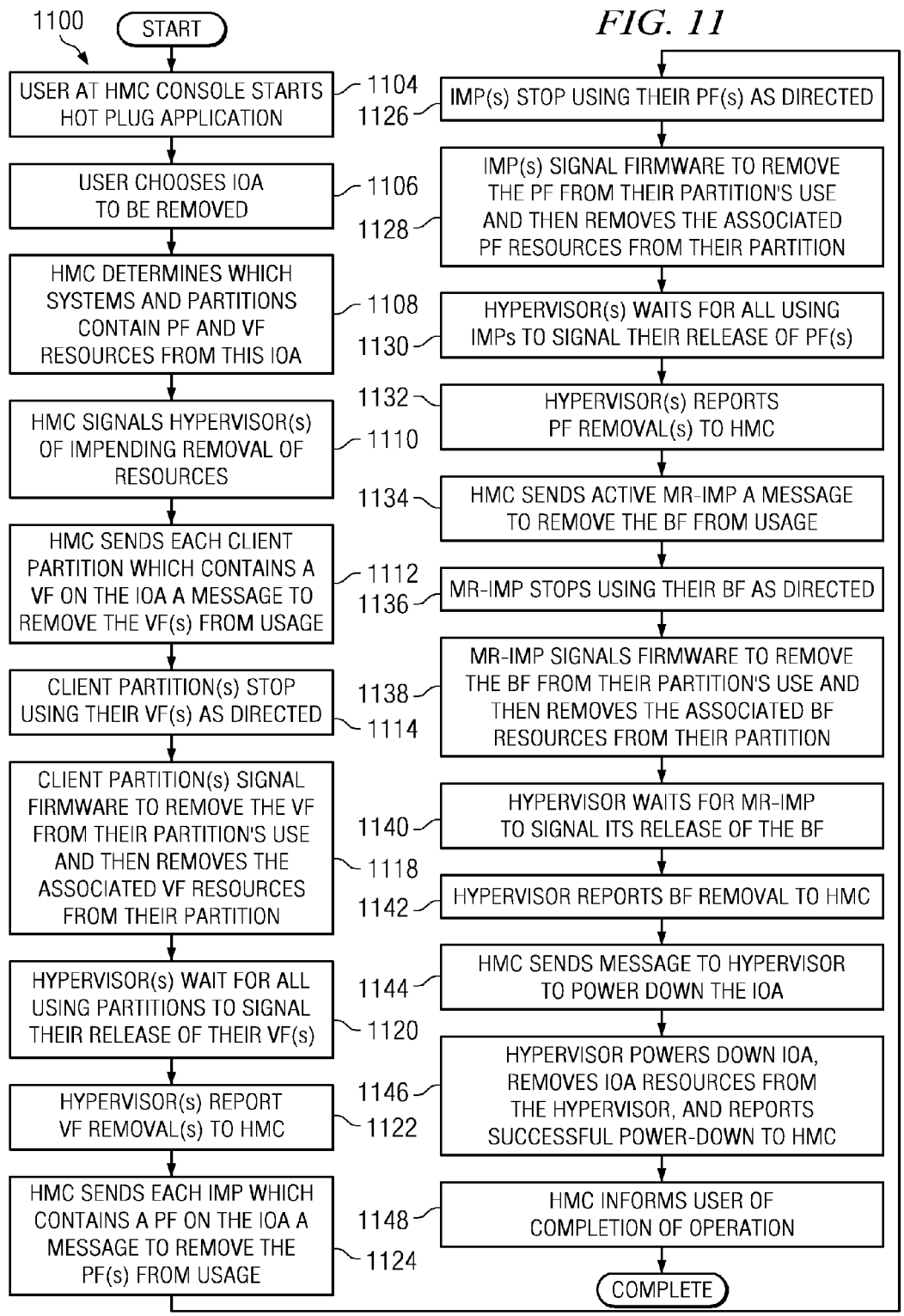

MULTI-ROOT I/O VIRTUALIZATION USING SEPARATE MANAGEMENT FACILITIES OF MULTIPLE LOGICAL PARTITIONS

BACKGROUND OF THE INVENTION

1. Field of the Invention

The present invention relates generally to an improved data processing system and method. More specifically, the present invention is directed to mechanisms for management of an input/output virtualization (IOV) adapter, such as a Peripheral Component Interconnect (PCI) IOV adapter, through a virtual intermediary in a hypervisor and through a management program in an IOV management partition. More specifically, the present invention relates to the sharing of an IOV adapter across multiple systems with a multi-root PCI manager (MR-PCIM) being implemented in a logical partition (LPAR) on at least one of the systems that is potentially sharing the IOV adapter.

2. Background of the Invention

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

FIG. 1 is an exemplary diagram illustrating a system that incorporates a PCI Express (PCIe) bus in accordance with the PCIe specification. The particular system shown in FIG. 1 is a blade enclosure in which a plurality of server blades 101-104 are provided. A server blade is a self-contained computer server designed to for high density systems. Server blades have many components removed for space, power and other considerations while still having all the functionality components to be considered a computer. The blade enclosure 100 provides services, such as power, cooling, networking, various interconnects, and management of the various blades 101-104 in the blade enclosure 100. The blades 101-104 and the blade enclosure 100 together form a blade system.

As shown in FIG. 1, PCIe is implemented on each of the server blades 101-104 and is used to connect to one of the PCIe devices 105-112. Each of these server blades 101-104 is then plugged into a slot in the blade enclosure 100 which then connects the outputs of the PCIe Ethernet devices 105, 107, 109, and 111 to an Ethernet switch 113, via a backplane in the blade enclosure 100, which then generates Ethernet connections 115 for external connectivity, i.e. communication connections to devices outside the blade enclosure 100. Similarly, each of the PCIe storage devices 106, 108, 110, and 112 are connected via the backplane in the blade enclosure 100 to a storage area network switch 114 which then generates storage area network connections 116 for external connectivity.

Thus, the system shown in FIG. 1 is exemplary of one type of data processing system in which the PCI and/or PCIe specifications are implemented. Other configurations of data processing systems are known that use the PCI and/or PCIe specifications. These systems are varied in architecture and thus, a detailed treatment of each cannot be made herein. For more information regarding PCI and PCIe, reference is made to the PCI and PCIe specifications available from the peripheral component interconnect special interest group (PCI-SIG) website at www.pcisig.com.

In addition to the PCI and PCIe specifications, the PCI-SIG has also defined input/output virtualization (IOV) standards for defining how to design an I/O adapter (IOA) which can be shared by several logical partitions (LPARs). A LPAR is a division of a computer's processors, memory, and storage into multiple sets of resources so that each set of resources can be operated independently with its own operating system instance and applications. The number of logical partitions that can be created depends on the system's processor model and resources available. Typically, partitions are used for different purposes such as database operation, client/server operation, to separate test and production environments, or the like. Each partition can communicate with the other partitions as if the other partition is in a separate machine. In modern systems that support LPARs, some resources may be shared amongst the LPARs. As mentioned above, in the PCI and PCIe specification, one such resource that may be shared is the I/O adapter using I/O virtualization mechanisms.

Further, the PCI-SIG has also defined IOV standards for sharing IOAs between multiple systems. This capability is referred to as multi-root (MR) IOV. FIG. 2 is an exemplary diagram illustrating a system incorporating a PCI Express (PCIe) MR IOV. In particular, FIG. 2 illustrates how the architecture shown in FIG. 1 can be modified in order to share the PCIe devices across multiple systems. The server blades 201-204 now generate PCIe root ports 205-212 and drive PCIe connections across the blade enclosure 200 backplane, instead of incorporating the PCIe devices themselves on the sever blades 201-204 as was done with the server blades 101-104 in FIG. 1. The PCIe links from each server blade 201-204 are then connected to one of the multi-root (MR) PCIe switches 213-214 which are in turn connected to the PCIe devices 217-220. The PCIe devices 217-220 connect to the external Ethernet and storage devices through the external connectivity 215 and 216. Thus, PCIe devices can be used within the blade enclosure 200. This reduces overall costs in that the number of PCIe devices 217-220 may be minimized since they are shared across server blades 201-204. Moreover, this may reduce the complexity and cost of the server blades 201-204 themselves by not requiring integration of the PCIe devices 217-220. While the PCI-SIG provides a standard for defining how to design an IOA which can be shared by several LPARs, this specification does not define how to connect the IOA into a host system. Moreover, the standard does not specify how to manage the shared functionality of an IOA utilizing I/O virtualization. The standard also does not specify how to manage the MR I/O fabric, for example MR fabric 221 in FIG. 2, when MR IOV is implemented. This is because the PCI-SIG specification is concerned with setting standards for the operation of the PCIe fabric below the root complex. In other words, the PCI-SIG does not provide any definition of standards for the root complex and above because that is considered the domain of system houses. That is, each of an Intel platform, an IBM Power® platform, and a Sparc platform, for example, may have different system implementation requirements that are not set forth in the PCI-SIG standards.

BRIEF SUMMARY OF THE INVENTION

In one illustrative embodiment, a method, in a data processing system, is provided for managing input/output (I/O) virtualization management operations. The method may comprise creating at least one multiple root I/O virtualization management partition (MR-IMP) in the data processing system. The method may further comprise controlling IOV management operations within the data processing system using the at least one MR-IMP. A multiple root I/O virtualization (MR-IOV) manager application of the MR-IMP may control access to base functions (BFs) of one or more I/O virtualization (IOV) enabled I/O endpoints of the data processing system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is an exemplary diagram illustrating a definition of a set of exemplary Logical Partition (LPAR) to platform firmware calls in accordance with one illustrative embodiment;

FIGS. 8A and 8B are an exemplary diagram illustrating a definition of a set of exemplary Hardware Management Console (HMC) to platform requests and responses in accordance with one illustrative embodiment;

FIG. 11 is a flowchart outlining an exemplary hot-plug operation for removing an MR-IOV adapter from a system in accordance with one illustrative embodiment;

DETAILED DESCRIPTION OF THE INVENTION

The illustrative embodiments provide mechanisms for management of a multi-root input/output virtualization (MR-IOV) adapter through a virtual intermediary in a hypervisor and through a management program in an IOV management partition (IMP) and MR-IOV fabric through a management program in an MR-IOV management partition (MR-IMP). Thus, in order to understand the mechanisms of the illustrative embodiments, it is important to first understand how I/O virtualization may be implemented in a system utilizing a virtualization platform. It should be appreciated that while the illustrative embodiments will be described with regard to Peripheral Component Interconnect Express (PCIe) adapters or endpoints, the present invention is not limited to such. Rather, the mechanisms of the illustrative embodiments may be implemented in any I/O fabric that supports I/O virtualization within the I/O adapters.

Moreover, it should be appreciated that while the illustrative embodiments will be described in terms of an implementation in which a hypervisor is utilized, the present invention is not limited to such. To the contrary, other types of virtualization platforms other than a hypervisor, whether implemented in software, hardware, or any combination of software and hardware, currently known or later developed, may be used without departing from the spirit and scope of the present invention.

Figure 1:
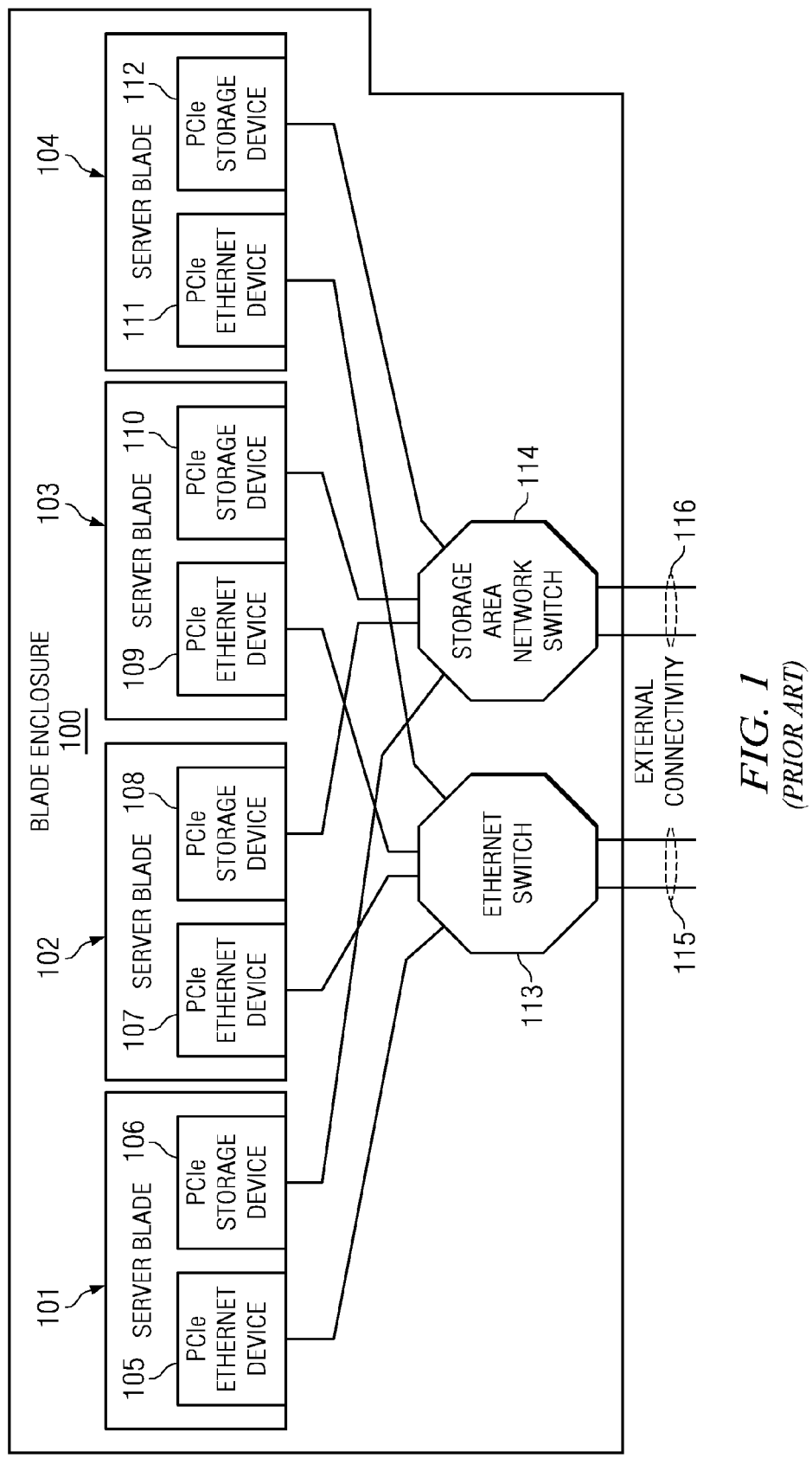
FIG. 1 is an exemplary diagram illustrating a known system architecture implementing a PCIe standard as is generally known in the art.
Figure 2:
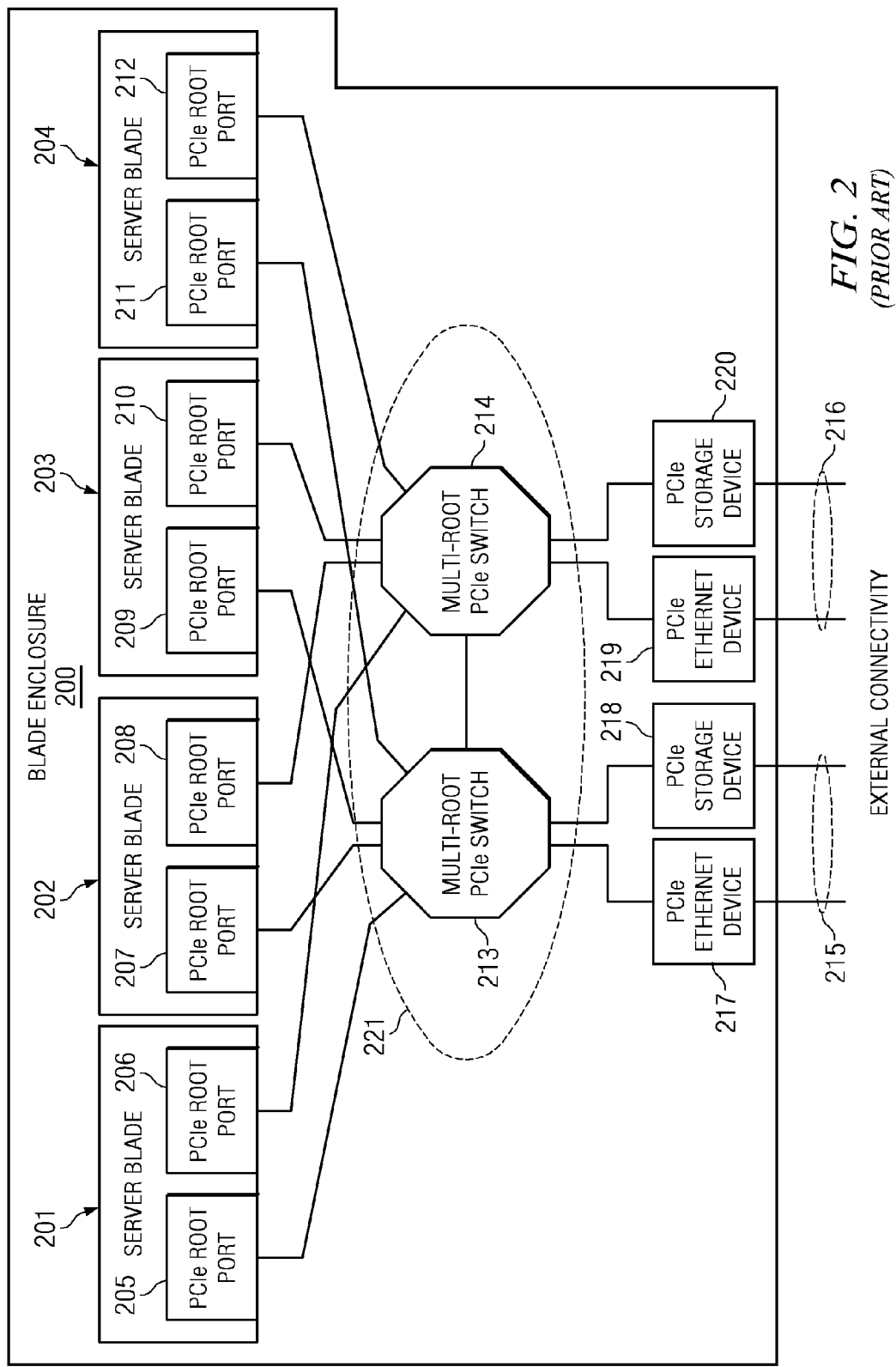
FIG. 2 is an exemplary diagram illustrating the system of FIG. 1 incorporating PCI multi-root I/O virtualization as is generally known in the art.
Figure 3:
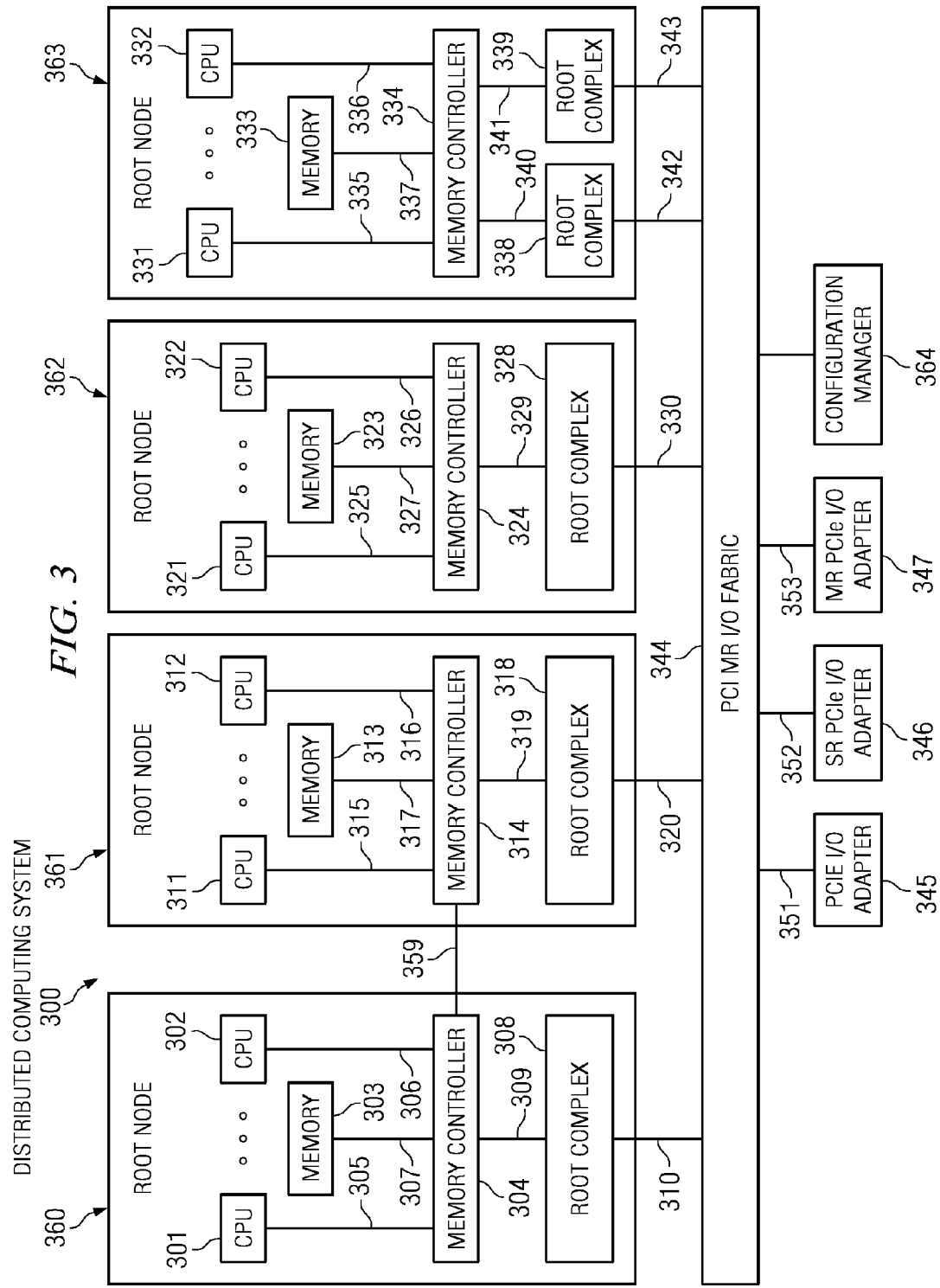
FIG. 3 is an exemplary diagram illustrating a distributed computing system utilizing a PCI multi-root I/O fabric.

With reference now to the figures and in particular with reference to FIG. 3, a diagram of a distributed computing system is illustrated in accordance with an illustrative embodiment of the present invention. As shown in FIG. 3, the distributed computer system 300 comprises a plurality of root nodes 360-363 coupled to a PCI MR I/O fabric 344 which in turn is coupled to a MR I/O fabric configuration manager 364 and PCIe I/O adapters or endpoints 345-347. Each root node 360-363 comprises one or more corresponding root complexes 308, 318, 328, 338, and 339, attached to the PCI MR I/O fabric 344 through I/O links 310, 320, 330, 342, and 343, respectively, and further attached to memory controllers 304, 314, 324, and 334 of the root nodes (RNs) 360-363. I/O fabric 344 is attached to IOAs 345, 346, and 347 through links 351, 352, and 353. IOAs 345, 346, and 3470 may be non-IOV enabled adapters such as in 345, single-root (SR) IOV adapters such as in 346, or multiple-root IOV adapters such as in 347.

As shown, the root complexes 308, 318, 328, 338, and 339 are part of root nodes 360, 361, 362, and 363. More than one root complex per root node may be present, such as is shown in root node 363. A root complex is the root of an I/O hierarchy that connects the CPU/memory to the I/O adapters. The root complex includes a host bridge, zero or more root complex integrated endpoints, zero or more root complex event collectors, and one or more root ports. Each root port supports a separate I/O hierarchy. The I/O hierarchies may be comprised of a root complex, e.g., root complex 308, zero or more interconnect switches and/or bridges (which comprise a switch or PCIe fabric, such as PCI MR I/O fabric 344), and one or more endpoints, such as PCIe I/O adapters or endpoints 345-347.

In addition to the root complexes, each root node consists of one or more central processing units (CPUs) 301, 302, 311, 312, 321, 322, 331, and 332, memory 303, 313, 323, and 333, memory controller 304, 314, 324, and 334 which connects CPUs 301, 302, 311, 312, 321, 322, 331, and 332, memory 303, 313, 323, and 333, and I/O root complexes 308, 318, 328, 338, and 339 and performs such functions as handling the coherency traffic for the memory. Root nodes 360 and 361 may be connected together at connection 359 through their memory controllers 304 and 314 to form one coherency domain. Thus, the root nodes 360-361 may act as a single symmetric multi-processing (SMP) system, or may be independent nodes with separate coherency domains as in root nodes 362 and 363.

The MR I/O fabric configuration manager 364 may be isolated from the other operations of the root nodes, and is therefore shown as attached separately to I/O fabric 344. However, this adds expense to the system, and therefore the embodiments as disclosed herein may include this functionality as part of one or more of the root nodes 360, 361, 362, and 363. Configuration manager 364 configures the shared resources of the MR I/O fabric 344 and assigns resources to root nodes 360, 361, 362, and 363.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
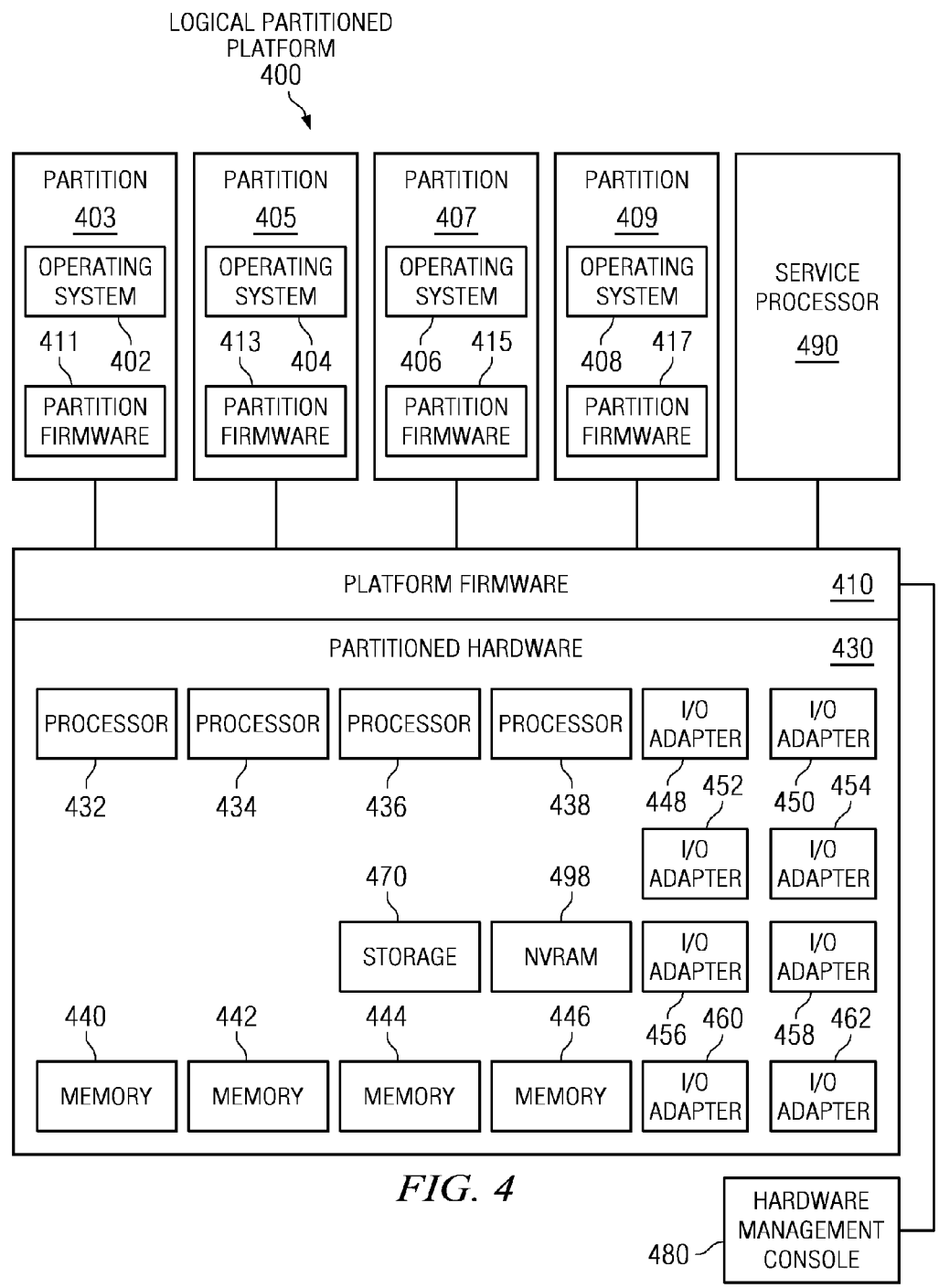
FIG. 4 is an exemplary diagram illustrating the virtualization of system resources using multiple logical partitions.

With reference now to FIG. 4, a block diagram of an exemplary logically partitioned platform is depicted in which illustrative embodiments of the present invention may be implemented. The hardware in logically partitioned platform 400 may be implemented, for example, within the root nodes 360, 361, 362, 363 in FIG. 3, and may further include portions of the MR I/O fabric 344 and I/O adapters 345-347 which are assigned to the root node.

Logically partitioned platform 400 includes partitioned hardware 430, operating systems 402, 404, 406, and 408, and platform firmware 410. Operating systems 402, 404, 406, and 408 may be multiple copies of a single operating system or multiple heterogeneous operating systems simultaneously run on logical partitioned platform 400.

Operating systems 402, 404, 406, and 408 are located in partitions 403, 405, 407, and 409. Hypervisor software, or firmware, is an example of software that may be used to implement platform firmware 410. Firmware is "software" stored in a memory chip that holds its content without electrical power, such as, for example, in a read-only memory (ROM), programmable ROM (PROM), erasable programmable ROM (EPROM), electrically erasable programmable ROM (EEPROM), and nonvolatile random access memory (NVRAM).

Additionally, partitions 403, 405, 407, and 409 also include partition firmware 411, 413, 415, and 417. Partition firmware 411, 413, 415, and 417 may be implemented using initial boot strap code, for example IEEE-1275 Standard Open Firmware, and runtime abstraction software (RTAS). When partitions 403, 405, 407, and 409 are instantiated, a copy of boot strap code is loaded onto partitions 403, 405, 407, and 409 by platform firmware 410. Thereafter, control is transferred to the boot strap code with the boot strap code then loading the open firmware and runtime abstraction software. The processors associated or assigned to partitions 403, 405, 407, and 409 are then dispatched to the partition's memory to execute partition firmware 411, 413, 415, and 417.

Partitioned hardware 430 includes a plurality of processors 432, 434, 436, and 438, a plurality of system memory units 440, 442, 444, and 446, a plurality of IOAs 448, 450, 452, 454, 456, 458, 460, and 462, storage unit 470, and non-volatile random access memory storage 498. Each of the processors 432, 434, 436, and 438, memory units 440, 442, 444, and 446, non-volatile random access memory storage 498, and IOAs 448, 450, 452, 454, 456, 458, 460, and 462, or parts thereof, may be assigned to one of multiple partitions within logical partitioned platform 400, each of which corresponds to one of operating systems 402, 404, 406, and 408.

Platform firmware 410 performs a number of functions and services for partitions 403, 405, 407, and 409 to create and enforce the partitioning of logical partitioned platform 400. Platform firmware 410 may include partition management firmware which may include a firmware implemented virtual machine identical to the underlying hardware. Thus, partition management firmware in the platform firmware 410 allows the simultaneous execution of independent operating system images 402, 404, 406, and 408 by virtualizing the hardware resources of logical partitioned platform 400.

Service processor 490 may be used to provide various services, such as processing of platform errors in partitions 403, 405, 407, and 409. These services also may act as a service agent to report errors back to a vendor, such as International Business Machines Corporation. Operations of partitions 403, 405, 407, and 409 may be controlled through a hardware management console, such as hardware management console 480. Hardware management console 480 is a separate distributed computing system from which a system administrator may perform various functions including real-location of resources to different partitions. Operations which may be controlled include things like the configuration of the partition relative to the components which are assigned to the partition, whether the partition is running or not.

In a logical partitioning (LPAR) environment, it is not permissible for resources or programs in one partition to affect operations in another partition. Furthermore, to be useful, the assignment of resources needs to be fine-grained. For example, it is often not acceptable to assign all IOAs under a particular PCI Host Bridge (PHB) to the same partition, as that will restrict configurability of the system, including the ability to dynamically move resources between partitions.

Accordingly, some functionality is needed in the bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

Figure 5A:
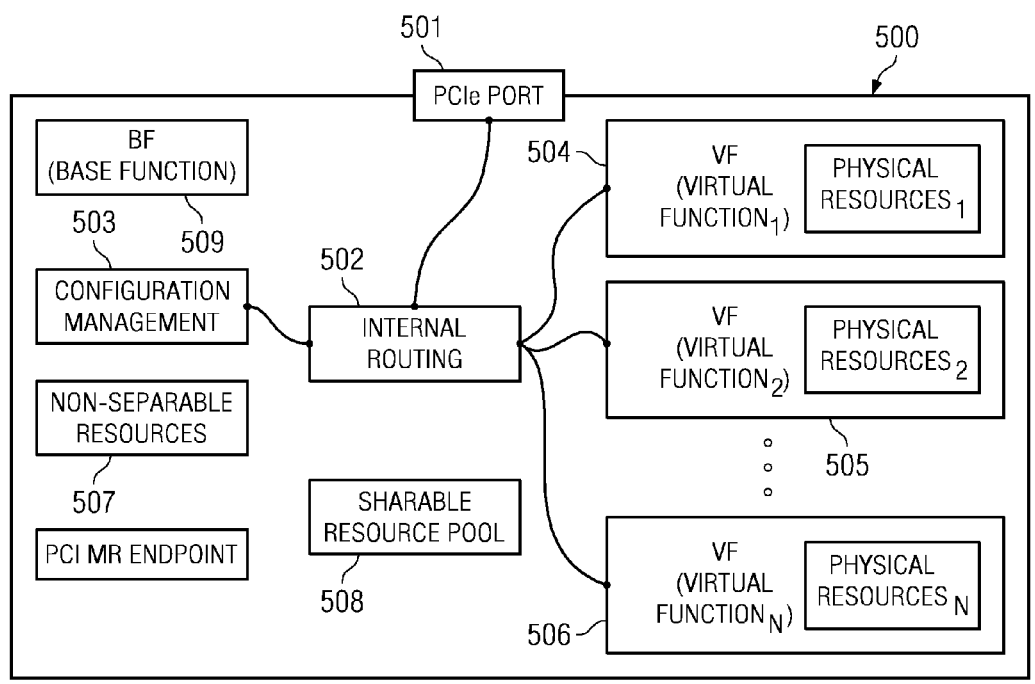
FIG. 5A is an exemplary diagram of a PCIe MR I/O virtualization enabled endpoint.

FIG. 5A is an exemplary diagram of a PCIe MR I/O virtualization (IOV) enabled endpoint. As shown in FIG. 5, the PCIe MR IOV endpoint 500 includes a PCIe port 501 through which communications with PCIe switches, and the like, of a PCIe fabric may be performed. Internal routing 502 provides communication pathways to a configuration management function 503 and 509 and a plurality of virtual functions (VFs) 504-506. The configuration management function 503 may be a physical function (PF) as opposed to the virtual functions 504-506 and configuration management function 509 may be a Base Function (BF) 509. A physical "function," as the term is used in the PCI specifications, is a set of logic that is represented by a single configuration space. In other words, a physical "function" is circuit logic that is configurable based on data stored in the function's associated configuration space in a memory, such as may be provided in the non-separable resources 507, for example. A similar statement can be made for the base "function" 509.

The configuration management function 503 may be used to configure the virtual functions 504-506. The virtual functions are functions, within an I/O virtualization enabled endpoint, that share one or more physical endpoint resources, e.g., a link, and which may be provided in the sharable resource pool 508 of the PCIe IOV endpoint 500, for example, with another function. The virtual functions can, without run-time intervention by a hypervisor, directly be a sink for I/O and memory operations from a system image, and be a source of Direct Memory Access (DMA), completion, and interrupt operations to a system image (SI).

The MR-IOV endpoint 500 can also be shared between multiple root nodes, for example 360-363 in FIG. 3. The configuration management function or base function 509 may be used to configure characteristics of the PFs, for example which root node has access to each PF.

PCIe endpoints may have many different types of configurations with regard to the "functions" supported by the PCIe endpoints. For example, endpoints may support a single physical function (PF), multiple independent PFs, or even multiple dependent PFs. In endpoints that support native I/O virtualization, each PF supported by the endpoints may be associated with one or more virtual functions (VFs), which themselves may be dependent upon VFs associated with other PFs. The unit of the IOV endpoint which is assigned to a root node is the PF, and MR-IOV enabled endpoints will contain multiple PFs.

Figure 5B:
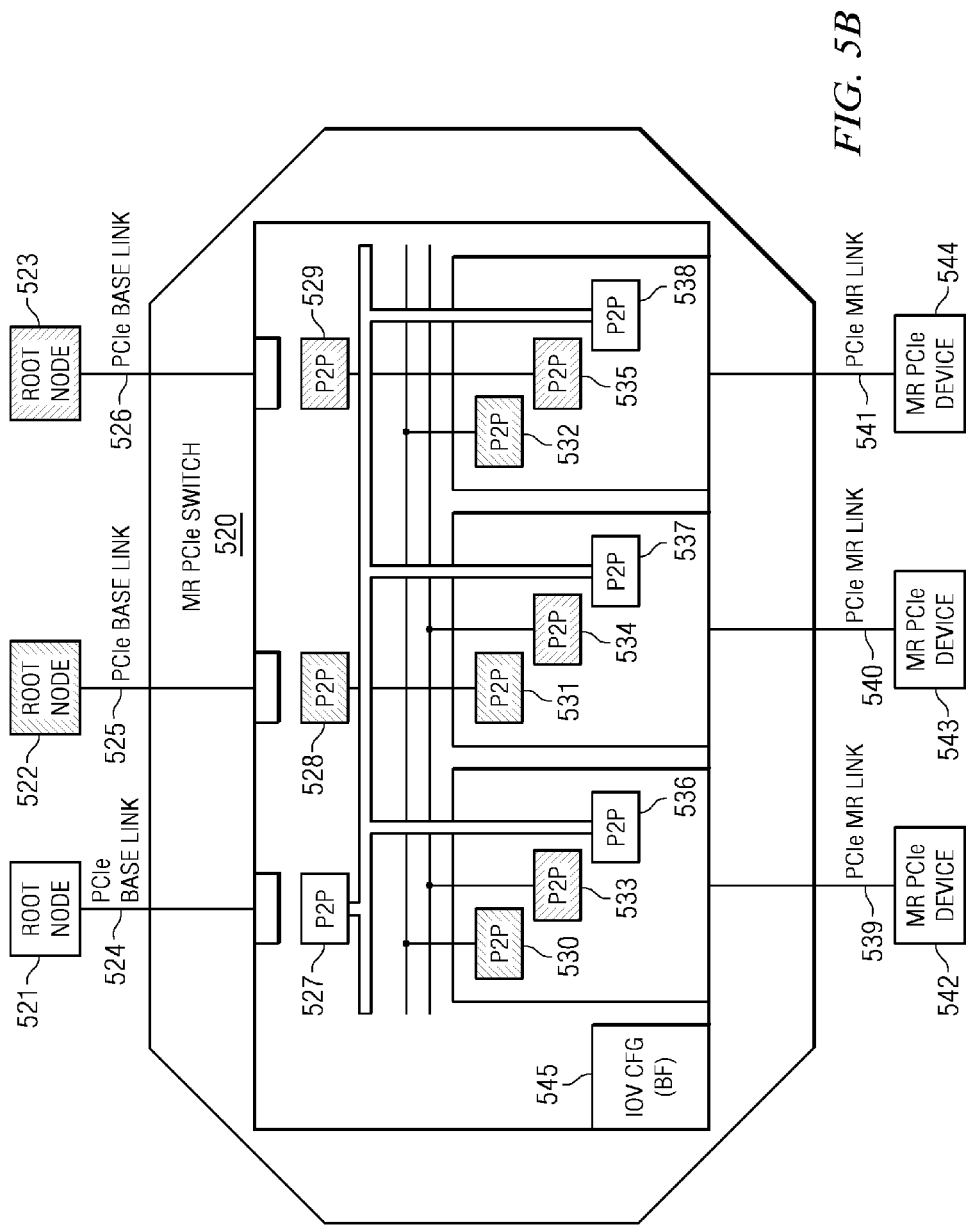
FIG. 5B is an exemplary diagram of a PCIe multi-root enabled PCIe switch.

FIG. 5B shows an illustration of the logical definition of an MR switch 520 which might be used, for example in the PCI MR I/O fabric 344 in FIG. 3, as defined by the PCI MR-IOV specification. The switch 520 logically consists of multiple virtual planes, one per port that is connected to a root node. For example, root node 521 connects to the logical PCI to PCI (P2P) bridge 527 which is logically connected internally to the switch to P2Ps 536-538. Similarly, root node 522 connects to the logical PCI to PCI (P2P) bridge 528 which is logically connected internally to the switch to P2Ps 530-532, and root node 523 connects to the logical PCI to PCI (P2P) bridge 529 which is logically connected internally to the switch to P2Ps 533-535.

P2P bridges 530, 533, and 536 then share PCIe MR link 539 so that they can share the resources of the MR PCIe device 542. In a similar manner, P2P bridges 531, 534, and 537 then share PCIe MR link 540 so that they can share the resources of the MR PCIe device 543, and P2P bridges 532, 535, and 538 then share PCIe MR link 541 so that they can share the resources of the MR PCIe device 544.

The control point for setting up the switch 520 is the Base Function (BF) 545. This IOV configuration mechanism, i.e. the BF 545, allows a multi-root PCI manager (MR-PCIM) program to determine what the logical structure is within the switch 520. For example, FIG. 5B shows a fairly symmetric configuration, with each root node 521-523 having some access to part of each MR PCIe device 542-544. In normal systems the system administrator may want to setup the I/O in a less symmetric way, in order to meet the needs of the users using the system.

The BF 545 and 509 are accessed by a MR-PCIM program. Where this program resides is not specified by the PCI SIG IOV specifications. It could reside, for example, in a node that is dedicated solely to MR-PCIM and is attached to one of the root port nodes, as is shown by one of the root nodes 521-523, or may be provided via a vendor-unique port with a separate processor attached, for example, a service processor as in 490 in FIG. 4. Regardless of where MR-PCIM is executed, the main requirement is that this program be robust and that it cannot be affected by the operations, or failure thereof, of other applications in the system. The methods described herein will allow for these requirements.

The illustrative embodiments provide a system and method for management of an input/output virtualization (IOV) adapter, such as the IOV enabled PCIe endpoint 500 shown in FIG. 5A, through a virtual intermediary in a hypervisor with functional management in an IOV management partition. The mechanisms of the illustrative embodiments address the situation where an input/output (I/O) fabric, which may comprise one or more PCIe switches such as PCIe switch 520 in FIG. 5B, is shared by more than one logical partition (LPAR) and where each LPAR can potentially share with the other LPARs an I/O adapter (IOA), e.g., a PCIe endpoint 353 in FIG. 3. The illustrative embodiments define a mechanism for one LPAR, the MR I/O virtualization management partition (MR-IMP), to control the MR shared functionality of an MR IOV enabled I/O fabric and MR IOV enabled IOA through a Base Function (BF), a second LPAR, the I/O virtualization management partition (IMP), to control the shared functionality of an IOV enabled IOA through a physical function (PF), while the virtual functions (VFs) are assigned to client partitions for normal direct I/O operations.

In particular, with the mechanisms of the illustrative embodiments, each LPAR is assigned its own separate address space to access a virtual function (VF) assigned to it, and to receive interrupts directly from the VF assigned to it, such that each LPAR's perception is that it has its own independent IOA for purposes of normal I/O operations. The set of VFs of an IOA, such as a PCI Express (PCIe) I/O Virtual (IOV) adapter, or I/O endpoint, may be shared across multiple LPARs, with each LPAR getting its own VF. The mechanisms of the illustrative embodiments provide facilities for management of the shared resources of the IOV adapter, or I/O endpoint, via a Physical Function (PF) of the IOV adapter/endpoint by assignment of that PF to an I/O Virtualization Management Partition (IMP). In addition, the IMP acts as the interface to the PF for purposes of accessing common VF functionality (for example, the network addresses for the VFs for a network adapter), which will be referred to here as the adapter south-side management. Furthermore, the mechanisms of the illustrative embodiments provide facilities for management of the MR shared resources of the MR IOV adapter, or I/O endpoint, via a Base Function (BF) of the IOV adapter/endpoint by assignment of that BF to an MR I/O Virtualization Management Partition (MR-IMP), where the MR-PCIM resides.

A hypervisor provides IOV independent facilities to the code running in the IMP, MR-IMP, and client partitions. The IMP and MR-IMP may include device specific code without the hypervisor needing to sacrifice its size, robustness, and upgradeability. The hypervisor provides the virtual intermediary functionality for the sharing and control of the IOV adapter's control functions. More specifically, the code running in the hypervisor acts as a virtual intermediary (VI) to the VFs for purposes of fully managing the VF error handling, VF reset, and configuration operations.

Figure 6:
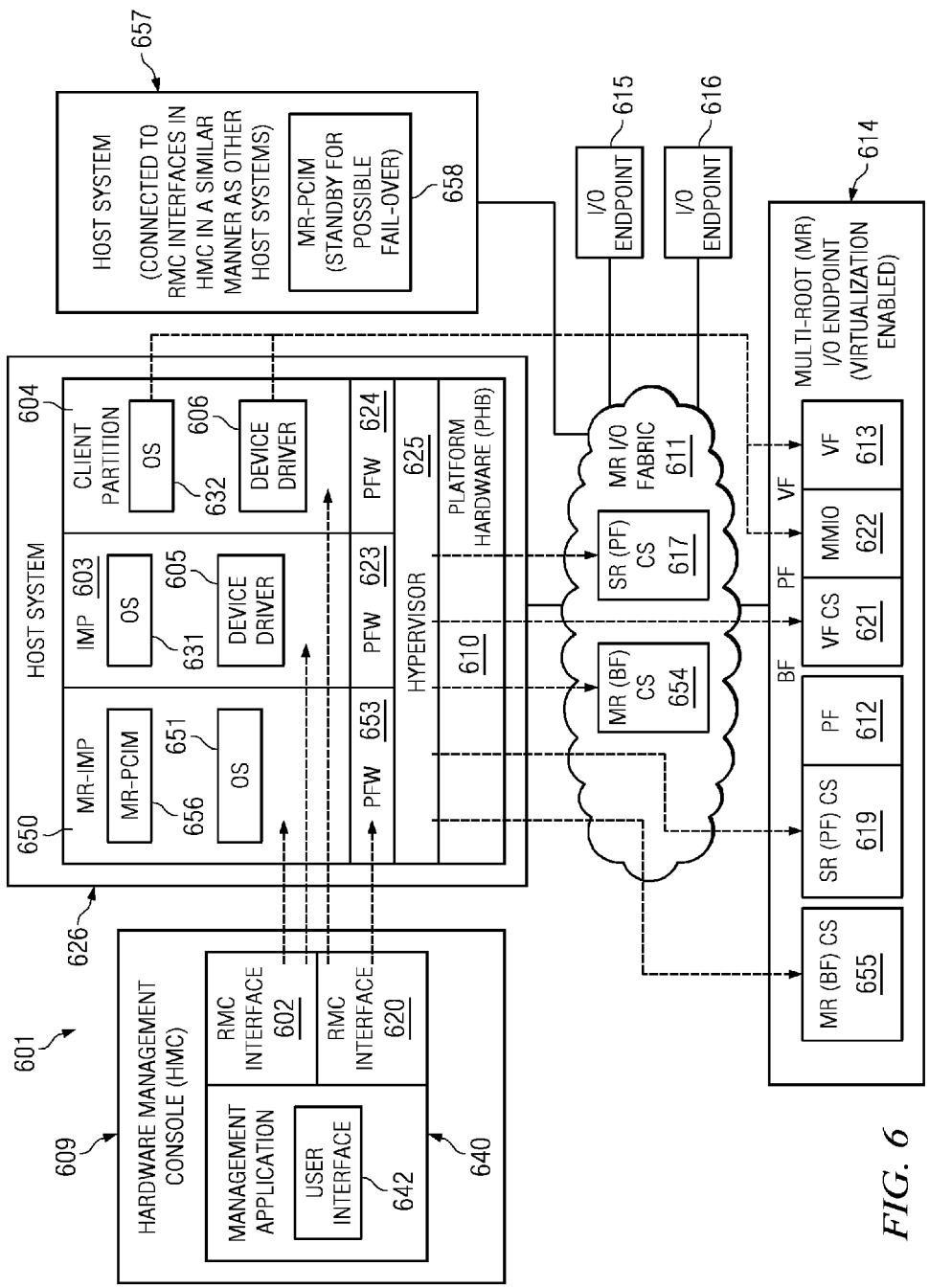
FIG. 6 is an exemplary diagram of a system structure in which an MR I/O fabric and MR IOV enabled endpoints, or adapters, are utilized in accordance with one illustrative embodiment.

FIG. 6 is an exemplary diagram of a system structure in which MR IOV enabled switches and endpoints, or adapters, are utilized in accordance with one illustrative embodiment. As shown in FIG. 6, the system 601 comprises host systems 626 and 657 which may be any data processing device, e.g., a server, client computing device, or the like, an MR I/O fabric 611 which may include one or communication links and one or more switches, and one or more I/O endpoints 614-616 which may be, in one illustrative embodiment, PCIe I/O endpoints with I/O endpoint 614 being an MR IOV enabled endpoint while the other endpoints 615-616 may be IOV enabled or non-IOV enabled endpoints. The host system 626 comprises platform hardware 610 which is the underlying hardware of the data processing device, a hypervisor 625, logical partitions (LPARS) 603, 604, and 650, and corresponding partition firmware (PFW) 623, 624, and 653. While the illustrative embodiments are described herein with regard to use with a hypervisor 625, it will be appreciated that other types of virtualization platforms may be utilized without departing from the spirit and scope of the present invention.

The hypervisor 625, in one illustrative embodiment, may be code that executes on the platform hardware 610, and is part of the platform's firmware. Similarly, the partition firmware (PFW) 623-624, and 653 may also be part of the platform's firmware, but is shown in association with the LPARs 603, 604, and 650 since they are logically considered to be part of the LPARs' code executing within the LPAR.

The LPARs 603, 604, and 650 have allocated resources and an operating system image or instance that executes within the LPAR. In addition, the LPARs 603, 604, and 650 may execute other applications, software, code, or the like within the LPAR, for example the MR-PCIM 656 in the MR-IMP 650. For example, with particular importance to the illustrative embodiments, one of the LPARs, e.g., LPAR 603, executes code that causes the LPAR 603 to operate as an IOV Management Partition (IMP) 603 and LPAR 650, executes code that causes the LPAR 650 to operate as an MR IOV Management Partition (MR-IMP) 650. Other LPARs 604 may operate as client partitions. While only one MR-IMP 650, one IMP 603, and one client partition 604 are shown in FIG. 6, it should be appreciated that more than one MR-IMP 650, IMP 603 and client partition 604 may be provided in a host system 626 without departing from the spirit and scope of the illustrative embodiments. Moreover, it should be appreciated that in some illustrative embodiments, the IMP 603 is optional and may not be present within the system structure. The functionality of the IMP 603 may be performed by other mechanisms including the MR-IMP 650, for example.

The hypervisor 625 has access to configuration spaces 619, 621, and 655 of the IOV endpoint 614 and to the I/O fabric 611 configuration spaces 617 and 654. The term "configuration space" as it is used herein refers to a disjoint address space from the memory mapped I/O (MMIO) address space that is allocated for use in storing configuration data for a particular component of the system 601. Further, the MR-IMP's operating system 631 has access through the hypervisor 625 to the configuration spaces 654 and 655 for the Base Functions (BFs) when they are assigned to the MR-IMP 650. Further, the IMP's operating system 631 and device driver 605 have access through the hypervisor 625 to the configuration space 619 for the Physical Functions (PFs) 612 when they are assigned to the IMP 603, and have access to the configuration spaces 621 of the Virtual Functions (VFs) 613 that belong to the PF assigned to the IMP 603. The client partition's operating system 632 and device driver 606 have access through the hypervisor 625 to any of the configuration spaces 621 of the VFs 613 which are assigned to them. The hypervisor 625 acts as an intermediary, or more specifically, as a Virtual Intermediary (VI) to make sure that the client partitions have access to the configuration spaces that they need to properly operate their VFs 613, but not to configuration spaces that could cause problems with other client partitions. That is, the client partitions 604 only have access to the configuration space allocated for their VFs 613. The client partitions 604 further have access to the Memory Mapped I/O (MMIO) space 622 for their assigned VFs 613.

A management application 640 on a Hardware Management Console (HMC) 609, which may be resident on the host system 626 or in a separate data processing device (as shown), and the HMC 609 itself, communicate through a Remote Management Command (RMC) interface 602 to the IMP 603 and client partitions 604 and through the same type interface 620 to the hypervisor 625. The management application 640 (referred to hereafter collectively with the HMC 609 as simply as the HMC 609), acts as the orchestrator to control functionality across the various components in the system 601, and provides a user interface 642 for a human to view system configurations and to input information about what resources that they want assigned to what LPARs 603-604. The management application 640 may provide many different functions which may be invoked by the user as described in greater detail hereafter. Alternatively, these functions may be automatically invoked without user intervention in response to an event or input triggering the initiation of such functions.

As mentioned above, the client partitions 604 may communicate through the hypervisor 625 with the IOV enabled endpoint 614 to access the configuration spaces 621 of their virtual functions (VFs) 613 in an IOV enabled endpoint 614. The hypervisor 625 acts as a virtual intermediary (VI) for such communications and prevents the client partitions from performing configuration operations on configurations spaces that would affect other client partitions, e.g., on configuration spaces of virtual functions (VFs) not assigned to that client partition.

The second host system 657 shown has similar characteristics as host system 626 described above, including connections to the RMC interfaces 602 and 620 in the HMC 609. Of particular interest is that there may be a second MR-PCIM 658 in host system 657 which works in conjunction with MR-PCIM 656 in MR-IMP 650 to provide a redundant MR-PCIM configuration. That is, one MR-PCIM, for example MR-PCIM 656, can be set as the primary or active MR-PCIM, for example by the HMC 609 while the other MR-PCIM, for example MR-PCIM 658, remains as a backup in the case the active MR-PCIM fails. Details on this fail-over method will be presented hereafter.

It can be appreciated that although two host systems are shown in FIG. 6, that more than two could be implemented. Moreover, those knowledgeable in the art can appreciate that there may be more than one standby MR-PCIM, so if, for example, that one host system, for example, host system 657, needs to be powered off, that another host system may be there with a standby MR-PCIM that can act as the backup MR-PCIM. It can also be appreciated that there can be more than one MR-IMP in a given host system, so that the MR-IMP with the active MR-PCIM and the MR-IMP with the standby MR-PCIM could be on the same host system, for example host system 626. Although this latter implementation does not provide as much hardware redundancy as does the case of having the MR-PCIMs in different host systems, it does allow for backup of the active MR-PCIM in the case of a failure in the active MR-PCIM's MR-IMP, for example a programming problem in the OS 651, partition firmware 653, or in the active MR-PCIM 656 itself.

FIG. 7 is an exemplary diagram illustrating a definition of a set of exemplary Logical Partition (LPAR) to platform firmware calls in accordance with one illustrative embodiment. In particular, FIG. 7 illustrates exemplary platform firmware calls 700 that can be used to implement aspects of the illustrative embodiments, as well as illustrates to which partitions (client, IMP, or MR-IMP) that these calls apply. These calls may be performed by the partitions 603, 604, or 650 to the associated platform firmware 623, 624, or 653 in FIG. 6, for example. Examples of the usage of these LPAR to platform firmware calls 700 will be given in the descriptions of various ones of FIGS. 9-18 hereafter. Descriptions of these calls will be made with continuing reference to the elements of FIG. 6 as exemplary of the elements that may perform the operations associated with these calls.

A first call 702, i.e. the read/write I/O configuration space call 702, is used by the client partition 604 to access a configuration space 621 of its associated VFs 613. The hypervisor 625 acts as a VI for these calls and prevents the client partitions 604 from performing configuration operations that would affect other client partitions. This call is also used by the IMP 603 to configure its PFs 619 with the hypervisor 625 again acting as the VI to prevent the IMP 603 from accessing the configuration spaces of PFs and VFs that are not part of its domain of control. In addition, as a VI in the IOV environment, the hypervisor 625 also needs to perform the actions specified by the PCI SIG IOV specification. This call is also used by the MR-IMP 650 to configure its BFs 654 and 655 with the hypervisor 625 again acting as the VI to prevent the MR-IMP 650 from accessing the configuration spaces of PFs and VFs that are not part of its domain of control.

The reset PF call 704 is one of the PF specific calls that may be made by the IMP 603. This call resets the PF, e.g., PF 612, and as a result, also resets all the VFs, e.g., VF 613, associated with the PF. When this call is made, the IMP 603 must first use the disable VF call 706, described hereafter, to disable all VFs associated with the PF, reset the PF, and then restore all the VF configurations to what they were before the PF reset.

The disable VF call 706 informs the platform firmware to disable any further MMIO operations to the VF(s) specified and to prevent Direct Memory Access (DMA) and interrupts from the VF(s) from getting through to the client partition 604. There are a number of ways to implement this to make sure that data integrity issues do not happen. In one illustrative embodiment, the hardware may be designed in such a way that if a client partition 604 tries to perform an MMIO Load operation from its VF, the client partition 604 may receive back all-1's data, just as though the VF was not there. The device driver 606 is expected to check for all-1's data when it is not expecting all-1's data, and to use the query PF/VF error state firmware call 710, described hereafter, to verify whether or not the all-1's represents an error state. The disable VF call 706 is expected to be used primarily in error recovery scenarios and thus, may invoke the VF driver, e.g., device driver 606, to enter into its own recovery, as described above and further described hereafter.

The client partitions 604 may reset their VFs 613 by using the reset VF call 708. The hypervisor 625 acts as a VI and validates that the VF 613 specified in the reset VF call 708 is assigned to the partition prior to issuing the reset to the VF 613. In this way, the hypervisor 625 prevents one client partition from resetting assigned to what partitions, because the hypervisor is involved in those assignment operations, as will be detailed hereafter, and can keep that information around for validation operations such as these, for example, by storing that information in one of the hypervisor's data structures.

The query BF/PF/VF error state call 710 is a call to the platform firmware that allows the MR-IMP 656, in the MR-IMP 650, PF driver, e.g., device driver 605, in the IMP 603, or the VF driver, e.g., device driver 606, in the client partition 604 to get the error state information for its BF 654 or 655, PF 612 or VF 613, respectively. This error state information may be obtained by the hypervisor from the hardware status registers, for example in the platform hardware 610. This error state may be set by the occurrence of an error in the operations of the I/O endpoint 614, for example, and may be used by the MR-IMP 656, in the MR-IMP 650, PF driver, e.g., device driver 605, in the IMP 603, or the VF driver, e.g., device driver 606, in the client partition 604 to be able to recover from errors. This error state information may be cleared from the hardware by a Reset PF 704 or Reset VF 706 call, for example.

To obtain platform error data for error recovery, the enable PF and VF for Load and Store operations call 712 and query I/O fabric error information call 714 are provided. When the query PF and VF error state call 710 returns error state information indicating to the appropriate device driver 605 or 606 that its associated PF 612 or VF 613 is in an error state, the device driver 605, 606 may use the enable PF and VF for Load and Store operations call 712 to open up a path to the PF 612 or VF 613 without allowing the DMA path to open. The device driver 605, 606 may then use MMIO Load and Store operations to get state information from the I/O endpoint 614 for problem determination purposes. The query I/O fabric error information call 714 may be used to get non-device-specific error information for problem determination in addition to the device specific error information from the MMIO Load and Storage operations.

The query interrupt source call 716 is used on all interrupts to get the interrupt source in order to virtualize the interrupt controller. Thus, as depicted in FIG. 7, the query interrupt source call 716 may be used by the client partition 604, the IMP 603, and the MR-IMP 650. The setup DMA translation call 718 is used to setup a translation mechanism for translating an I/O address to a system address. Such address translation mechanisms are required for I/O virtualization. The hypervisor 625 acts as a VI for these calls and prevents the client partitions 604 from setting up address translations that would affect other client partitions. The hypervisor 625 is responsible for assigning resources, for example memory, processors, and I/O resources, to the various partitions, and thereafter keeps that information in its data structures for validating a partition's authority for accessing that resource, e.g., a particular memory address. As shown in FIG. 7, the setup DMA translation call 718 may be used by the client partition 604 but not generally the IMP 603 or MR-IMP 650 because the PF and BF does not generally need to do DMA operations to the IMP 603 or MR-IMP 650.

Finally, the Add/Remove VF from LPAR use call 720, Add/Remove PF from LPAR use call 722, and Add/Remove BF from LPAR use call 724 are for use in IOA Hot Plug and dynamic reconfiguration operations, as will be described hereafter. The Add/Remove VF from LPAR use call 720 may be used by the client partitions 604 but not the IMP 603 or MR-IMP 650 since, by definition, the VFs are not assigned to the IMP 603 or MR-IMP 650 and the owner of the VF controls the hot plugging of the VF. The Add/Remove PF from LPAR use call 722 may be used by the IMP 603 but not the client partitions 604 or MR-IMP 650. The client partition 604 is not permitted to change the PF in any way and thus, cannot use the Add/Remove PF from LPAR use call 722 since allowing the client partition 604 to do so may pose a security issue for VFs associated with other client partitions that are associated with the PF. The Add/Remove BF from LPAR use call 724 may be used by the MR-IMP 650 but not the client partitions 604 or IMP 603. The client partition 604 is not permitted to change the BF in any way and thus, cannot use the Add/Remove BF from LPAR use call 724 since allowing the client partition 604 to do so may pose a security issue for VFs associated with other client partitions that are associated with the BF.

FIGS. 8A and 8B are an exemplary diagram illustrating a definition of a set of exemplary Hardware Management Console (HMC) to platform requests and responses in accordance with one illustrative embodiment. In particular, FIGS. 8A and 8B illustrate exemplary HMC to platform firmware request/responses 800 and identifies to which component in the system that this request is expected to be made as well as the component's expected response. These calls may be made, for example, by the HMC 609 in FIG. 6, via one or more of the interfaces 602 and 620. For example, if the HMC 609 makes a call that is targeting the MR-IMP 650, the IMP 603 the client partition 604, or one of the corresponding partitions in the second host system 657, the HMC 609 may make the call via the RMC interface 602. If the HMC 609 is making a call that targets the hypervisor 625, e.g., a hypervisor, then the call may be made via the interface 620. Examples of the usage of these HMC to platform requests/responses 800 will be provided in greater detail with regard to various ones of FIGS. 9-18 hereafter.

As shown in FIGS. 8A and 8B, the hypervisor 625 may be queried for the I/O fabric configuration by use of the query I/O fabric configuration request 802. This request 802 may be used by the HMC 609, for example, on initial system bring-up in an MR environment to determine that the I/O fabric is an MR fabric or in an SR environment to get all the possible I/O devices and their functions, so that these can be presented to the user for selection and assignment to the various LPARs that the user wishes to configure. In a similar manner, the query I/O fabric configuration request 803 can be used to request the MR I/O fabric configuration information from the active MR-PCIM in the MR-IMP which hosts that MR-PCIM, for example MR-PCIM 656 in MR-IMP 650.

The set LPAR SR I/O configuration request 804 is used by the HMC 609 to inform the hypervisor 625 what the user at the HMC 609 has decided to configure. This configuration includes not only the I/O configuration, but also the LPAR configuration characteristics, such as the number of CPUs assigned and the amount of memory assigned to the various LPARs in the system. In a similar manner, the set MR fabric configuration 805 can be used to request the active MR-PCIM in the MR-IMP which hosts that MR-PCIM, for example MR-PCIM 656 in MR-IMP 650, to access the BFs, for example BF 654 and BF 655, so that the proper PFs get assigned to the proper host systems, as will be described in greater detail hereafter. The hypervisor 625 may also be informed by the HMC 609 when to power up and power down an I/O adapter or endpoint. This may be accomplished through the power up/down IOA request 806.

There are several HMC to platform requests 808-812 that are used by the HMC to direct the dynamic addition of a BF, PF or VF to the system, i.e. while the system is operational and after initial configuration. The dynamic add of BF/PF/VF request 808 is used by the HMC 609 to inform the hypervisor 625 to expect the addition of specific resources to an LPAR or to multiple LPARs. The hypervisor 625 needs to be informed in advance of the intent to add such resources so that it can allocate resources for those LPARs. In this way, when the LPAR requests the hypervisor 625 to add a BF, VF or PF to its LPAR, that the hypervisor 625 is already prepared to allocate those resources.

Once the hypervisor 625 has completed the dynamic add of BF/PF/VF request 808, the IMP 603 and client partitions 604 may be informed of any additions. The dynamic add of a BF request 809 informs the MR-IMP 650 that a new PF is available to be added. This might happen, for example, on a hot plug add of an I/O adapter or endpoint to a system, as discussed hereafter. This request 809 informs the MR-IMP 650 to add the BF to its fabric configuration, initialize the BF configuration space, and query for the PFs that were added along with the BF. The MR-IMP 650 signals completion of the operation to the hypervisor 625 by the "add" capability of the add/remove BF from LPAR use call 724 in FIG. 7.

The dynamic add of a PF request 810 informs the IMP 603 that a new PF is available to be added. This might happen, for example, on a hot plug add of an I/O adapter or endpoint to a system, as discussed hereafter. This request 810 informs the IMP 603 to add the PF to its fabric configuration, initialize the PF configuration space, load the device driver, and enable the PF's IOV capability. The IMP 603 signals completion of the operation to the hypervisor 625 by the "add" capability of the add/remove PF from LPAR use call 722 in FIG. 7.

The dynamic add of a VF request 812 informs a client partition 604 that a new VF is available to be added. This might happen, for example, on a hot plug add of an I/O adapter or endpoint to a system or when the user wants to add additional capability of an already existing I/O adapter or endpoint with unused VFs, to a client partition 604. This request 812 informs the client partition 604 to add the VF to its fabric configuration, initialize the VF configuration space, load the device driver, and begin using the VF. The client partition 604 signals completion of the operation to the hypervisor 625 by the "add" capability of the add/remove VF from LPAR use call 720.

There are several HMC to platform requests 814-819 that are used by the HMC 609 to direct the dynamic removal of a BF, PF or VF from the system, i.e. while the system is operational and after the initial configuration. The dynamic remove of BF/PF/VF request 814 is used by the HMC 609 to inform the hypervisor 625 to expect the removal of specific resources from an LPAR or from multiple LPARs. The hypervisor 625 needs to be informed in advance so that it can de-allocate resources for those LPARs after the removals are signaled by the LPAR(s). Once the hypervisor 625 has completed the dynamic remove of BF/PF/VF request 814, the MR-IMP 650, IMP 603, and client partitions 604 may be informed of any removals.

The dynamic remove of a VF request 816 is then used by the HMC 609 to inform a client partition 604 that a VF needs to be removed from use and from the LPAR's configuration. This might happen, for example, on a hot plug remove of an I/O adapter or endpoint from a system or when the user wants to remove a capability of an already existing I/O adapter or endpoint from a client partition 604, for example so that it may be re-assigned to another LPAR for that LPAR's use. This request informs the client partition 604 to stop using the VF, request reset of the VF, remove the device driver, and remove the VF from the OS's fabric configuration. The client partition 604 signals completion of the operation to the hypervisor 625 by the "remove" capability of the add/remove VF from LPAR use call 720.

The dynamic remove of a PF request 818 informs an IMP 603 that a PF is to be removed. Prior to issuing this request, the HMC 609 must have removed all VFs associated with the PF from the using client partitions 604, as described above. Removal of a PF might happen, for example, on a hot plug remove of an I/O adapter or endpoint from a system. This request 818 informs the IMP 603 to stop using the PF, request reset of the PF through the reset call 704, remove the device driver, and remove the PF from the OS's fabric configuration. The IMP 603 signals completion of the operation to the hypervisor 625 by the "remove" capability of the add/remove PF from LPAR use call 722.

The dynamic remove of a BF request 819 informs an MR-IMP 650 that a BF is to be removed. Prior to issuing this request, the HMC 609 must have removed all VFs and PFs associated with the BF from the using client partitions 604 and using IMPs 603, as described above. Removal of a BF might happen, for example, on a hot plug remove of an I/O adapter or endpoint from a system. This request 819 informs the MR-IMP 650 to stop using the BF and remove the BF from the OS's fabric configuration. The MR-IMP 650 signals completion of the operation to the hypervisor 625 by the "remove" capability of the add/remove BF from LPAR use call 724.

An important function of the IMP 603 is to provide secure access to resources of the I/O adapter or endpoint that are either shared across the multiple LPARs that are using the VFs associated with a PF, or are unique to a VF but which should not be accessible for change by the PF. One example of such a resource of a network I/O adapter or endpoint is the network address associated with a PF which is shared by the VFs, or a network address that is unique to a VF. Management of these device-specific resources will be referred to here as "south side" management of the I/O adapter or endpoint. This is accomplished through the HMC 609 by the I/O adapter (IOA), or endpoint, south side management request 820, and all such management is secured via a security application on the HMC 609, e.g., a logon application or other authentication application. When the IMP 603 receives an IOA south side management request 820 for an IOA, the IMP 603 passes the request to the device driver 605 for the PF, and the device driver 605 makes the device-specific request through a PF interface to the IOA in order to accomplish the request.

The current status of all of the HMC to platform requests 800 may be made to the target of the original request by use of the query previous command completion and status request 822. This allows the HMC 609 to coordinate a series of HMC requests, and to indicate to the user through an HMC interface a status of a previous request. Such a request may be made because some operations may be rather slow to complete and it is desirable to be able to access the current statues of such requests.

The MR-PCIM 656 may be backed up by a standby MR-PCIM 658. There are several HMC to platform requests 824-826 that are used by the HMC 609 to monitor the MR-PCIMs to determine if they are operating properly and to manage the redundant MR-PCIMS, so that one is in control at any point in time, and that only one is in control. The query MR-PCIM status request 824 is used to determine if an MR-PCIM is alive and well, that is that it is operating properly. For the active MR-PCIM, for example MR-PCIM 656, operating properly means that it is performing the I/O fabric monitoring functions. For the standby MR-PCIM, for example MR-PCIM 658, operating normally means that it is ready to take over the operations of the active MR-PCIM, if necessary.

The present description now turns to a more detailed explanation of the use of the various requests and calls illustrated above in FIGS. 7-8. FIGS. 9-18 are flowcharts outlining various operations of the mechanisms of the illustrative embodiments. The operations outlined in FIGS. 9-18 may be implemented by the various mechanisms, e.g., HMC, hypervisor, IMP, client partition, platform firmware/hardware, I/O endpoint, and the like, depicted in FIG. 6, for example. Thus, where appropriate, reference will be made to elements of FIG. 6 as one example of the mechanisms of the illustrative embodiments that may participate in the performance of the operations outlined in FIGS. 9-18.

It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

Figure 9A:
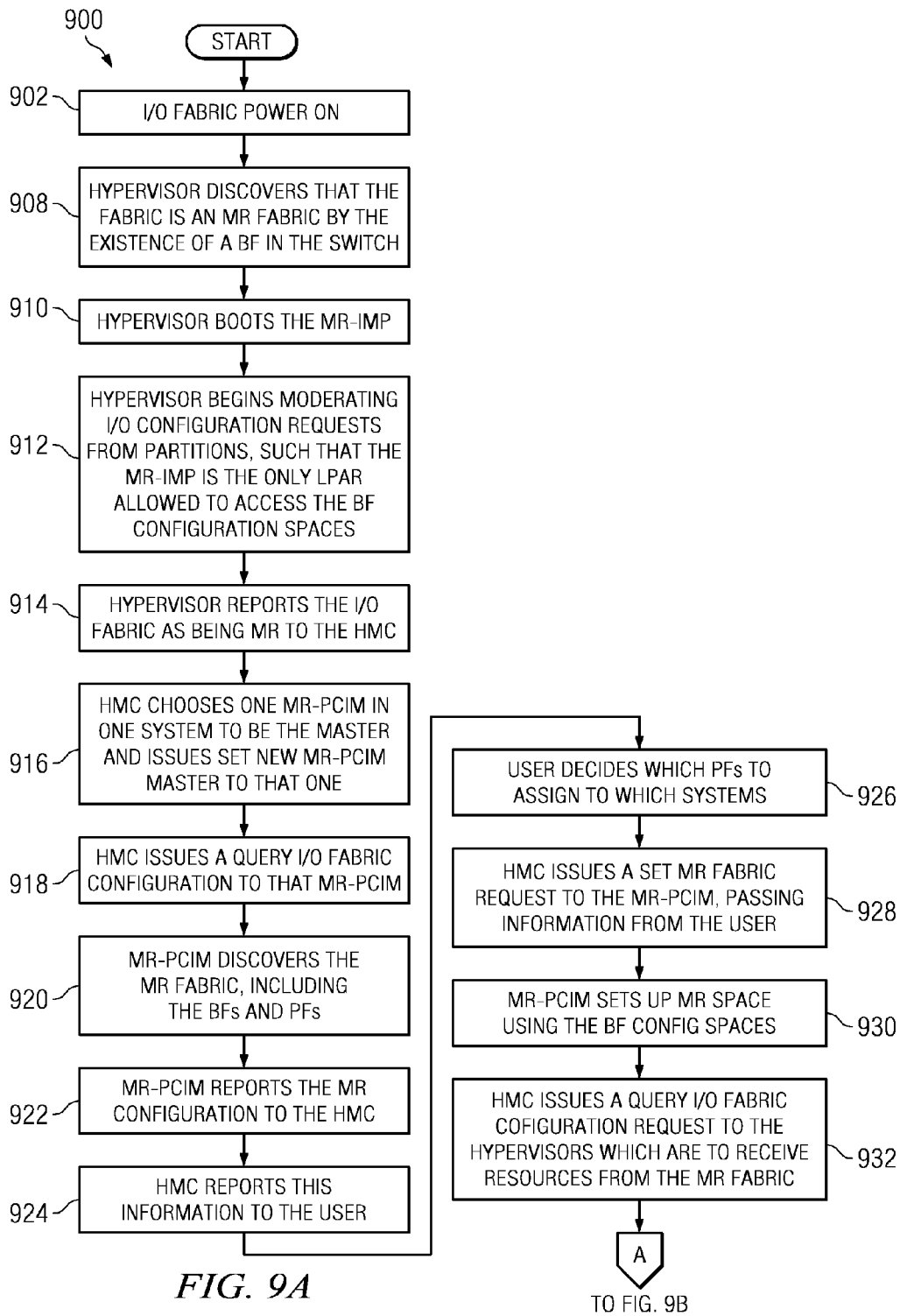
FIGS. 9A and 9B are a flowchart outlining an exemplary "bring-up" operation for a system with a MR I/O virtualized I/O (MR-IOV) fabric and MR I/O virtualized (MR-IOV) adapters in accordance with one illustrative embodiment.
Figure 9B:
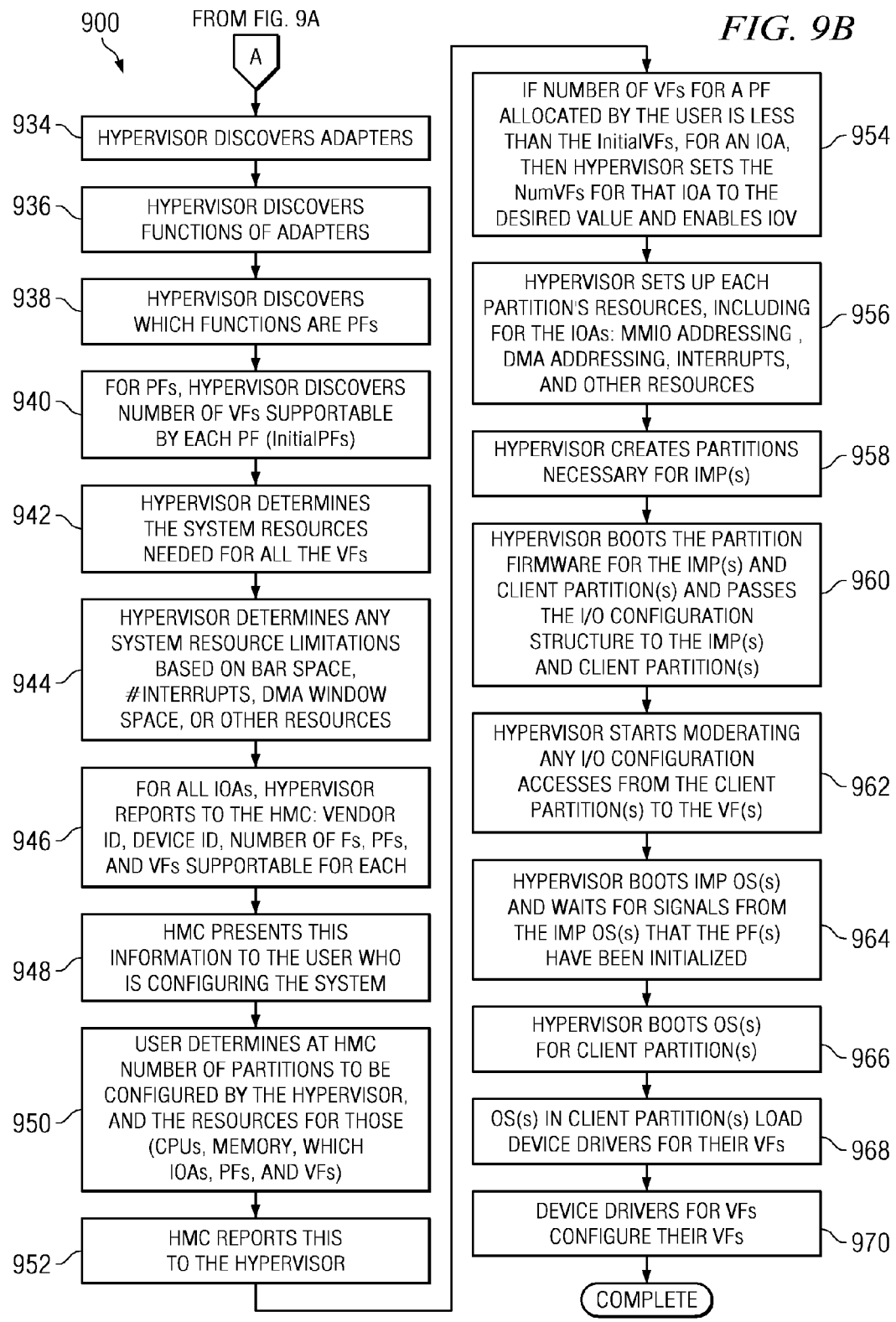

FIGS. 9A and 9B are a flowchart outlining an exemplary "bring-up" operation for a system with MR I/O fabric and MR I/O Virtualized (IOV) adapters in accordance with one illustrative embodiment. As shown in FIGS. 9A and 9B, the initial I/O fabric bring-up operation 900 starts with an I/O fabric power on being performed (step 902). In response to the power-on of the I/O fabric, the hypervisor 625 may discover, such as by probing a configuration space of the I/O fabric 611, that the I/O fabric is an MR I/O fabric, by the presence of a BF in the switch in the fabric (step 908). The hypervisor 625 may then boot the MR-IMP 650 (step 910) and may begin moderating I/O configuration requests from partitions, such that the MR-IMP is the only LPAR allowed to access the BF configuration spaces (step 912). This moderation of configuration access from the MR-IMP 650 to the MR configuration spaces 654-655 is important to assure that only the MR-PCIM 656, or the standby MR-PCIM 658, may change the I/O fabric configuration. In addition to the hypervisor 625 implementing this isolation, it is possible for the hardware to assist. For example, having multiple root complexes, as in root complex 338-339 of FIG. 3, can assist the hypervisor 625 in keeping the address spaces separated, with one root complex, for example root complex 338 being assigned just for accessing the MR configuration spaces.

The hypervisor 625 may report the I/O fabric 611 as being MR to the HMC 609 (step 914). The HMC 609 may choose one MR-PCIM, for example MR-PCIM 656 in one host system, to be the master and may inform that MR-PCIM that it is the master (step 916), for example by the set new MR-PCIM master HMC request 826 in FIGS. 8A and 8B. The HMC 609 may then query the selected MR-PCIM for the I/O fabric configuration (step 918), for example by the query I/O fabric configuration request 803 in FIGS. 8A and 8B. The MR-PCIM 656 may discover the I/O fabric 611 and MR I/O endpoint 614 configuration, including the BFs and PFs (step 920), for example by use of the read/write I/O configuration space call 702 in FIG. 7. The MR-PCIM 656 may report the MR configuration back to the HMC 609 (step 922) and the HMC 609 may report this information to the user that is configuring the system (step 924), for example by use of the user interface 642.

It is now up to the user at the HMC 609 to determine how they want to allocate the resources across the various host systems 626, 657. Note that this could also be done by automated scripts running in the HMC 609, rather than a human being, or any other automated mechanism for assigning or allocating system resources to logical partitions of the host system 626, 657. In addition, for I/O fabric configuration after the initial fabric configuration, the HMC 609 may save previous configuration information in the HMC 609, for example in non-volatile storage such as a hard disk in the HMC 609, may compare this to the newly reported I/O configuration and then may either configure the fabric the way it was on a previous fabric bring-up, without involving the user when the configuration has not changed, or may present to the user only the changes in the I/O fabric from the previous configuration, so that the user may not have to reconfigure everything on each I/O fabric power-on. In the exemplary embodiment, the user may decide from this information how they want to configure the MR I/O fabric 611 and MR I/O endpoints, for example MR I/O endpoint 614 (step 926), and this information may then be passed to the active MR-PCIM 656, for example by use of the set MR fabric configuration request 805 in FIGS. 8A and 8B (step 928). The MR-PCIM 656 may set the I/O fabric 611 and MR I/O endpoint 614 configuration, including the BFs and PFs based on this information (step 930), for example by use of the read/write I/O configuration space call 702 in FIG. 7.

This completes the MR part of the I/O fabric setup, and now the hypervisors, for example hypervisor 625, may now be instructed to start their discovery of the PFs and VFs in the fabric. The process continues and the HMC 609 may query the hypervisors, for example hypervisor 625, as to what I/O configuration that they can observe, for example by the query I/O fabric configuration request 802 in FIGS. 8A and 8B (step 932), and the process continues in FIG. 9B.

Each hypervisor, for example hypervisor 625 in host system 626, may now scan its I/O fabric, for example by the read/write I/O configuration space call 702 in FIG. 7 and may discover the I/O adapters (IOAs), or endpoints, for example I/O endpoint 614 (step 934). The hypervisor may then discover all the functions on each IOA (step 936), for example, by the read/write I/O configuration space call 702 in FIG. 7 and may discover which of these are PFs (step 938). The determination of which functions are PFs is made by the presence of the SR-IOV configuration header in the I/O configuration space for the IOA, as specified by the PCI SIG IOV specifications.

For PFs, the hypervisor 625 may probe the configuration space further to determine the number of VFs supportable by each PF (step 940), such as by reading an InitialVFs field in the configuration space of each PF, for example. The hypervisor 625 may then determine all the system resources necessary for the I/O adapters (IOAs) 614-616 in the host system 626, and more specifically in this case, those resources needed by the VFs (step 942). Resources include items such as I/O address space required for mapping the IOA into the memory space for Memory Mapped I/O (MMIO) load and store operations from the processors in the system, the number of Requester Identifiers (RIDs) needed, the amount of DMA window space needed, and the number of interrupts needed, and the like. The DMA window space is the amount of table space needed for the address translation facilities in the Root Complex (RC).

Once the determination has been made as to the resources needed, the hypervisor 625 may determine if it needs to limit the number of VFs that get enabled, due to resource restrictions in the host system 626 (step 944). The hypervisor 625 may then report all the information it has collected from probing the I/O configuration space to the HMC 609 (step 946), such as for presentation to a user. The HMC 609 may report this information to the hypervisor as a response to the query I/O fabric configuration HMC request 802 in FIGS. 8A and 8B, for example. The user may then assign resources to the LPARs or to the available pool of free resources. The information reported may include, for example, information that the user needs in order to make the decision on what is in the I/O fabric and endpoints, including items such as the Vendor ID, Device ID, and number of functions. The information may further include a number of PFs supported by the I/O adapters or endpoints, a number of VFs supportable for each PF, such as may be determined by the PFs' InitialVFs and the calculation of the number of supportable VFs due to system limitations as calculated by the hypervisor 625 in the manner mentioned above, and the like.

It is now up to the user at the HMC 609 to determine how they want to allocate all the system resources. Note that this could also be done by automated scripts running in the HMC 609, rather than a human being, or any other automated mechanism for assigning or allocating system resources to logical partitions of the host system 626. In addition, for I/O fabric configuration after the initial fabric configuration, the HMC 609 may save previous configuration information in the HMC 609, for example in non-volatile storage such as a hard disk in the HMC 609, may compare this to the newly reported I/O configuration and then may either configure the fabric the way it was on a previous fabric bring-up, without involving the user when the configuration has not changed, or may present to the user only the changes in the I/O fabric from the previous configuration, so that the user may not have to reconfigure everything on each I/O fabric power-on. The HMC 609 hence, in the exemplary embodiment, presents the I/O fabric and endpoint information collected to the user (step 948) and the user specifies how the resources are to be allocated (step 950). This allocation not only includes I/O, but will also include other system resources such as processors and memory. Once the user has made the assignments of resources, this is reported to the hypervisor 625 (step 952) via the set initial LPAR I/O configuration HMC request 804 in FIGS. 8A and 8B, for example.

For VFs, if the number of VFs specified by the user (both assigned and free pool) are less than InitialVFs for the corresponding PF, then the hypervisor 625 may set a NumVFs configuration space parameter of the PF to the desired value, and may enable I/O virtualization for the PFs via a VF enable bit as defined by the PCI IOV specification (step 954). The hypervisor 625 may then sets up each partition's resources including MMIO addressing, DMA addressing, interrupts, and other resources (step 956) and may create partitions necessary for the IMP(s) 603 (step 958).

The hypervisor 625 may then boot the partition firmware 623 and 624 for the IMP(s) 603 and client partition(s) 604 and may pass the I/O configuration structure to the IMP(s) 603 and client partition(s) 604 for use by the OSs in those LPARs (step 930). The hypervisor 625, on assignment of the VF(s) 613 to the client partition(s) 604, starts moderating, i.e. starts acting as a virtual intermediary, for all I/O configuration accesses from the client partition(s) 604 to their VF(s) 613 (step 962). The hypervisor 625 may boot the IMP partitions' OS(s) and then may wait for an indication from the IMP(s) 603 that the PF(s) 612 have been initialized (step 964). The IMP(s) 603 may give this indication via the "add" function of the add/remove PF from LPAR use firmware call 722 in FIG. 7, for example.

Once the IMP 603 for a VF 613 has initialized the PF 612, the OS for the VF 613 may be loaded (step 966). The client partition(s) 604 may load the device drivers 606 for their VF(s) 613 (step 968). Once a device drive 606 is loaded for a VF 613, it needs to configure its VF 613 via the read/write I/O configuration space call 702 (step 970), for example. The device driver 606 may then begin to use its VF 613 and the operation then terminates.

Figure 10A:
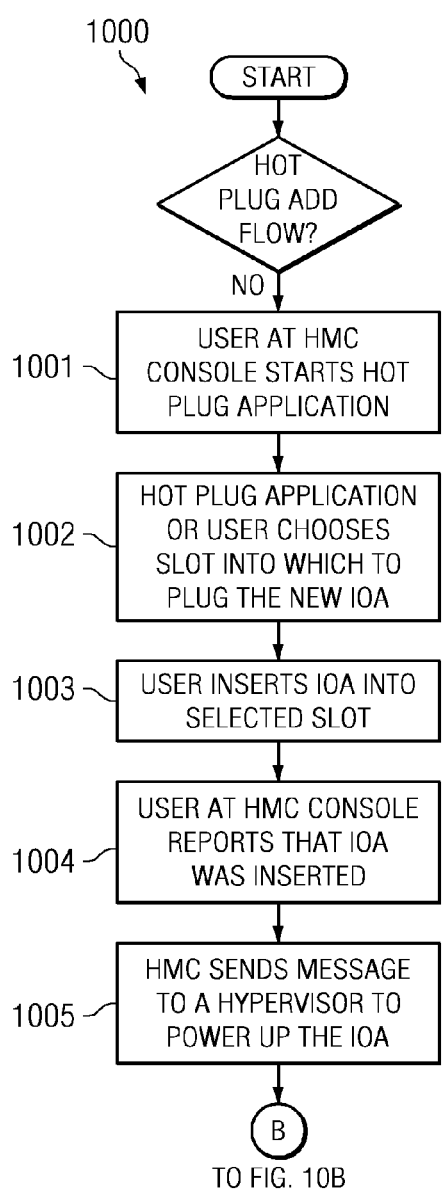
FIGS. 10A-10C are a flowchart outlining an exemplary hot-plug operation for adding an MR-IOV adapter to a system in accordance with one illustrative embodiment.
Figure 10B:
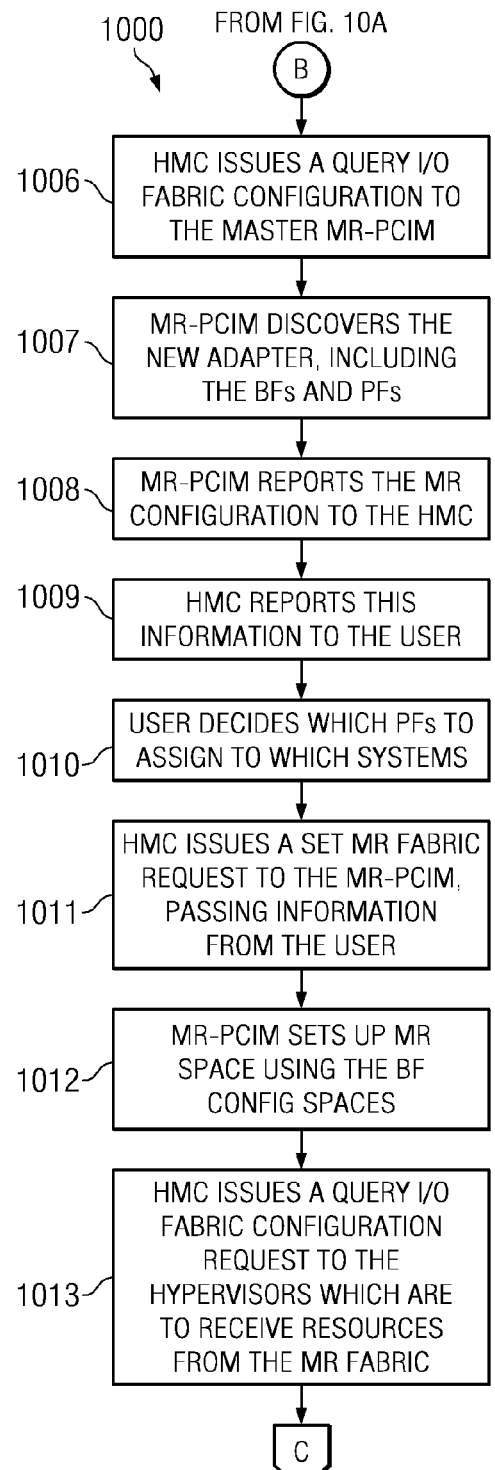
Figure 10C:
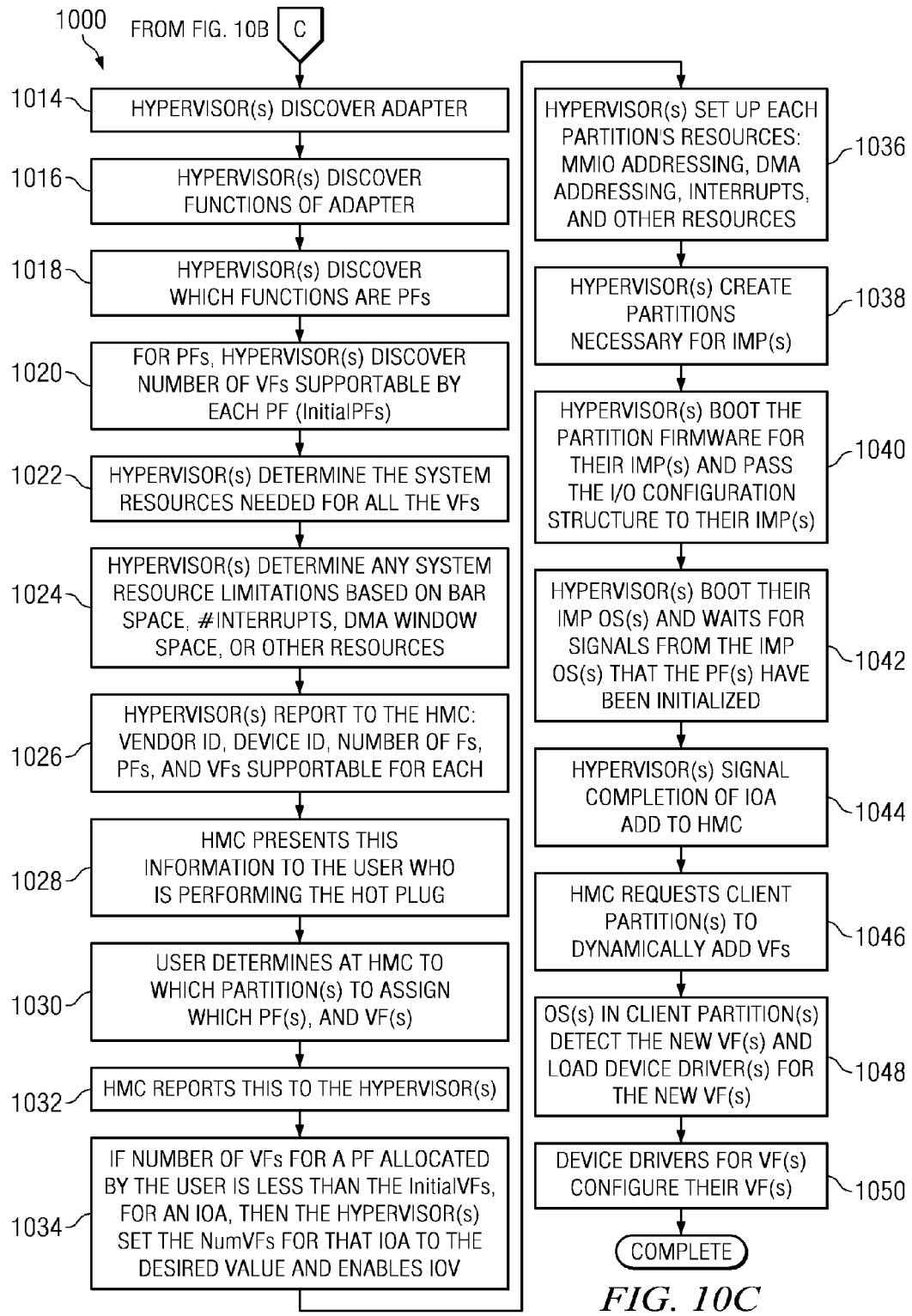

Once the system is up and operational, it is desirable to be able to add new I/O adapters or endpoints dynamically to the system. FIGS. 10A-10C are a flowchart outlining an exemplary hot-plug operation for adding an IOV adapter to a system in accordance with one illustrative embodiment. As shown in FIGS. 10A-10C, the hot-plug addition operation 1000 starts with the user, at the HMC console 609, starting a hot-plug application (step 1001) which provides a user interface to direct the user through the hot-plug operation. From the hot-plug application, the user or the application may select an empty I/O slot in the I/O fabric 611 into which to plug the new I/O adapter or endpoint, e.g., I/O endpoint 614 (step 1002). The user may then plug-in the new I/O adapter (IOA) or endpoint (step 1003) and may report via the HMC 609 that the IOA has been plugged-in (step 1004). Those skilled in the art recognize that hot-plug applications for I/O buses, such as PCIe, can be invoked automatically by inserting a new IOA into an unused slot and having the system automatically invoke the hot-plug application. The HMC 609 may then send a message to the hypervisor 625 to power up the IOA by using the "power up" capability of the power up/down HMC request 806 in FIGS. 8A and 8B, for example, and may get its configuration information (step 1005), and the operation continues to step 1006 in FIG. 10B.

The HMC 609 may issue a query to the MR-PCIM 656 to query the I/O fabric for the change (step 1006), for example by the query I/O fabric configuration 803 in FIGS. 8A and 8B. The MR-PCIM 656 may discover the new adapter, including the BFs and PFs (step 1007), for example by the use of the read/write I/O configuration space call 702 in FIG. 7. The MR-PCIM 656 may report the configuration to the HMC 609 (step 1008) and the HMC 609 may report this to the user (step 1009), for example by the use of the user interface 642. The user may decide which PFs to assign to which host systems 626, 657 (step 1010) and the HMC 609 may then report the I/O configuration selected to MR-PCIM 656 (step 1011), for example by the set MR fabric configuration request 605 in FIG. 6. MR-PCIM 656 may set up the MR configuration spaces in the BFs 654-655 appropriately (step 1012), for example by use of the read/write I/O configuration space call 702 in FIG. 7. The HMC 609 may then request that the hypervisors in the host systems 626, 657 which are to receive resources from the added IOA, query their I/O fabric configurations (step 1013), for example by the use of the query I/O fabric configuration request 802 in FIGS. 8A and 8B, in order to discover the new resources. The process continues with step 1014 in FIG. 10C. In a similar manner that the hypervisor 625 gathered information in the initial fabric bring-up operation 900, the hypervisor 625 may discover the IOA (step 1014), may discover the functions on the IOA (step 1016), and may discover which functions are PFs (step 1018). For PFs, the hypervisor 625 may discover the number of VFs supportable by each PF (step 1020), may determine the system resources necessary (step 1022), determines the system resource limitations (step 1024), and may report the IOA configuration information to the HMC 609 (step 1026).

The HMC 609 may present the configuration information to the user (step 1028). The user may specify which resources to assign to which client partitions (step 1030) and the HMC 609 may report this resource allocation to the hypervisor 625 (step 1032) and the hypervisor 625 may set the NumVFs in the configuration space if necessary (step 1034). The hypervisor 625 may set up each partition's resources (step 1036) and may create partition(s) for the new IMP(s) 603 (step 1038). The hypervisor 625 may boot the IMP(s) 603 and pass the I/O configuration structure to those IMP(s) 603 (step 1040), may boot the IMP OS(s), and may wait for signals from the IMP OS(s) that the PFs 612 have been initialized (step 1042). At this point, the IOA addition is complete except for the VF 613 addition and the hypervisor 625 may signal the PF 612 addition complete to the HMC 609 (step 1044).

The HMC 609 may now issue a dynamic add of VF request 812 to the client partition(s) 604 which are to receive a VF 613 from the new IOA 614. This starts the client partition 604 processes to add the VF(s) (step 1046). The OS(s) in the client partition(s) 604 may detect the new VF(s) 613 and may load device driver(s) 606 for the new VF(s) 613 (step 1048). The device driver(s) 606 for the VF(s) 613 may configure their VF(s) 613 via the read/write I/O configuration space call 702 (step 1050), for example, and may begin using their newly configured VF(s) 613. The operation then terminates.

In addition to dynamically adding I/O adapters or endpoints to the I/O fabric 611 of the system 601 of the illustrative embodiments, it is beneficial to be able to allow I/O adapters or endpoints to be dynamically removed from the I/O fabric 611. FIG. 11 is a flowchart outlining an exemplary hot-plug operation for removing an IOV adapter from a system in accordance with one illustrative embodiment. As shown in FIG. 11, the hot-plug removal operation 1100 starts with the user at the HMC console 609 starting the hot-plug application (step 1104). The user may choose that an I/O adapter (IOA) or endpoint, such as I/O endpoint 614, be removed (step 1106).

The HMC 609 determines which host systems and partitions, if any, contain BF 655, PF 612 and VF 613 resources from the IOA to be removed (step 1108). The HMC 609 may signal the hypervisor 625 of the impending removal of the resources (step 1110) by use of the dynamic remove of BF/PF/VF request 814, for example. The HMC 609 may then send each client partition 604 which contains a VF 613 on the IOA, a request to remove the VF from usage (step 1112) via a dynamic remove of VF request 816, for example. The client partition(s) 604 may stop using their VF(s) 613 associated with the dynamic remove of VF request 816 (step 1114).

The client partition(s) 604 may signal the hypervisor 625 to remove their VF(s) 613 from use by the client partition(s) 604 (step 1118) via the "remove" capability of the add/remove from LPAR use call 720, for example. The hypervisor 625 waits for all using client partitions 604 to signal their release of their VF(s) (step 1120) and then may report the VF removal (s) to the HMC 609 (step 1122).

The VF removal being complete, the HMC 609 may now start the process of removing the PF(s) 612 associated with the IOA 614. The HMC 609 does this by sending each IMP 603 which contains a PF 612 on the IOA 614 a message to remove the PF(s) 612 from usage (step 1124) via the dynamic remove of PF request 818, for example. The IMP(s) 603 may then stop using the specified PF(s) 612 as directed (step 1126) and signal the hypervisor 625 to remove the PF 612 from their partition's use by the "remove" capability of the add/remove PF from LPAR use call 722. The IMP(s) 603 may then remove the associated PF 612 resources from their partition (step 1128).

The hypervisor 625 waits for all using IMP(s) 603 to signal their release of the PF(s) 612 (step 1130) and may then report the PF removal(s) to the HMC 609 (step 1132).

The PF removal being complete, the HMC 609 may now start the process of removing the BF 655 associated with the IOA 614. The HMC 609 does this by sending the active MR-PCIM 656 in MR-IMP 650, which manages the BF 655 on the IOA 614, a message to remove the BF 655 from usage (step 1134) via the dynamic remove of BF request 819, for example. The MR-PCIM 656 may then stop using the specified BF 655 as directed (step 1136) and signal the hypervisor 625 to remove the BF 655 from their partition's use by the "remove" capability of the add/remove BF from LPAR use call 724, for example. The MR-PCIM 656 may then remove the associated BF 655 resources from their partition (step 1138).

The hypervisor 625 waits for the MR-PCIM 656 to signal their release of the BF 655 (step 1140) and may then report the BF removal to the HMC 609 (step 1142).

The IOA 614 is now no longer in use, and the HMC 609 may send a message to the hypervisor 625 to turn off power to the IOA 614 (step 1144) via the "power down" capability of the power up/down IOA request 806, for example. The hypervisor 625 may then power down the IOA 614, may remove the IOA 614 resources from the hypervisor 625, and may report completion to the HMC 609 (step 1146). The HMC 609 may report the completion to the user (step 1148), whereas the user can then unplug the IOA 614, if desired, and the operation is complete.

Figure 12:
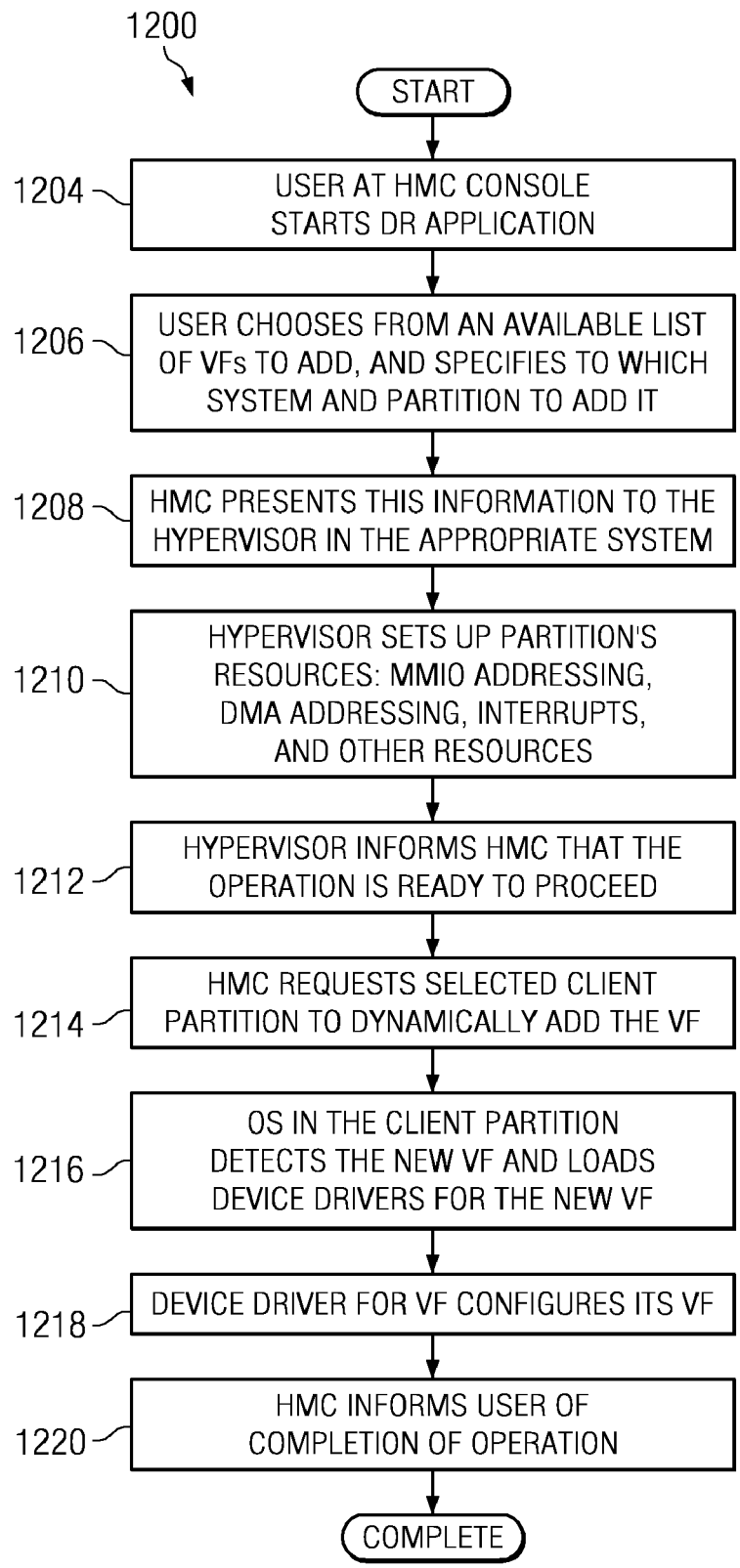
FIG. 12 is a flowchart outlining an exemplary operation for dynamically adding a virtual function (VF) to a logical partition (LPAR) in accordance with one illustrative embodiment.

One of the useful features of I/O virtualization and the implementation of VFs is the capability to have enough resources in the system to dynamically shift those resources around when necessary for load balancing. This can be done by having a pool of available resources from which VFs can be selected for adding to an LPAR, or by removing a VF from an LAPR that is not necessarily making good use of the VF's resources and adding the VF to a LPAR that can make better use of the VF's resources. FIG. 12 is a flowchart outlining an exemplary operation for dynamically adding a virtual function (VF) to a logical partition (LPAR) in accordance with one illustrative embodiment. The operation outlined in FIG. 12 may be used to shift the VF's resources from one LPAR to another when needed to optimize the operation of the system 601, for example.

As shown in FIG. 12, the VF addition operation 1200 starts with the user at the HMC 609 starting a Dynamic Reconfiguration (DR) application (step 1204). The user may choose from an available list of VFs 613 to add, and may specify to which client partition to add the VF 613 (step 1206). The HMC 609 may present this information to the hypervisor 625 (step 1208) via the dynamic add of PF/VF request 808, for example. The hypervisor 625 may set up the client partition's resources, including MMIO addressing, DMA addressing, interrupts, and the like (step 1210).

The hypervisor 625 may inform the HMC 609 that the operation is ready to proceed (step 1212) by signaling completion of the requested operation. The HMC 609 may next request the client partition 604 to dynamically add the VF 613 (step 1214) via the dynamic add of VF request 812. The client partition 604 may detect the new VF 613 and may load the device driver 606 for the new VF 613 (step 1216). The device driver 606 for the VF 613 may configure its VF 613 (step 1218) via the read/write I/O configuration space call 702, for example. Finally, the HMC 609 may inform the user of the completion of the operation and the operation is complete (step 1220).

Figure 13:
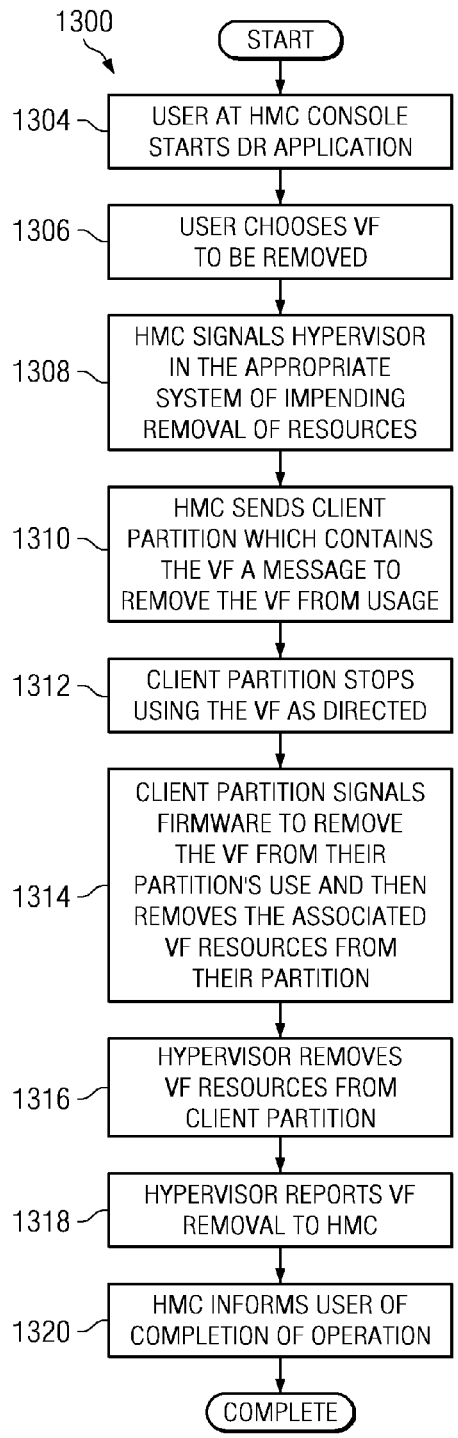
FIG. 13 is a flowchart outlining an exemplary operation for dynamically removing a VF from a LPAR in accordance with one illustrative embodiment.

FIG. 13 is a flowchart outlining an exemplary operation for dynamically removing a VF from a LPAR in accordance with one illustrative embodiment. The dynamic VF remove operation 1300 in FIG. 13 is the other piece of the capability to move around I/O resources between the various LPARs of the system 601. That is, a VF may be removed from its association with one LPAR using the operation shown in FIG. 13 and then added to another LPAR using the VF add operation outlined in FIG. 12 above. This remove of a VF from one partition and adding to another partition may be done by a manual user process, as indicated in the detailed examples, or may be done automatically by determination by a program that the VF is underutilized by one partition and could be used by another partition. Such load balancing programs are known in the art for resources like memory. The VF dynamic remove and add of the present invention described here can be used to extend the load balancing programs to balance I/O resources as well.

As shown in FIG. 13, the VF removal operation 1300 starts with the user starting the DR application at the HMC 609 (step 1304). The user may choose a VF, such as VF 613, to be removed (step 1306) and the HMC 609 may send a dynamic remove PF/VF request 818, for example, to the hypervisor 625 (step 1308) of the appropriate host system 626 or 657. The HMC 609 may send a dynamic remove of VF request 816, for example, to the client partition 604 which is assigned the VF to start the VF removal process (step 1310). The client partition 604 may receive this request and stop using the VF 613 as directed (step 1312).

The client partition 604 may signal the hypervisor 625 to remove the VF 613 from the partition's use via the "remove" function of the add/remove VF from LPAR use call 720, for example (step 1314). The hypervisor 625 may then remove the associated VF 613 resources from the client partition 604 (step 1316). The hypervisor 625 may report the VF removal to the HMC 609 (step 1318). The HMC 609 may inform the user of the completion of the operation (step 1320) and the operation terminates.

In addition to dynamically adding and removing I/O adapters or endpoints, and being able to shift VFs and their associated resources among LPARs, in a virtualized system it is useful for robustness of error handling to be able to recover from errors. The illustrative embodiments provide a mechanism for being able to recover from errors by retrieving error information, logging the error information, resetting and configuring the VFs, and then attempting to restart outstanding I/O operations. This operation is outlined in FIG. 14 as described hereafter.

Figure 14:
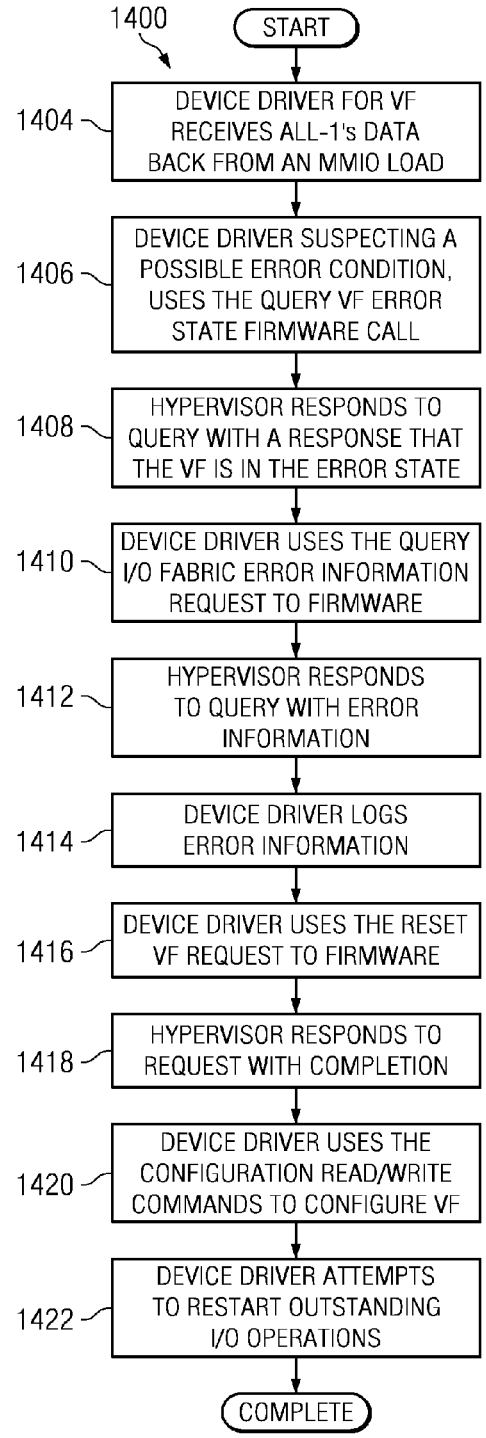
FIG. 14 is a flowchart outlining an exemplary operation for error recovery from an error incurred by a VF in accordance with one illustrative embodiment.

FIG. 14 is a flowchart outlining an exemplary operation for error recovery from an error incurred by a VF in accordance with one illustrative embodiment. The operation outlined in FIG. 14 uses an existing technique of stopping all DMA and MMIO to a VF until the device driver can recognize that there was an error, and can gracefully recover. However, the operation of FIG. 14 utilizes the mechanisms of the illustrative embodiments to augment this existing technique to control the error recovery process for VFs.

As shown in FIG. 14, the VF error recovery operation 1400 starts after an error has occurred which has put the VF into a MMIO Stopped State and DMA Stopped State. In this state, no DMA operations from the VF will be completed, MMIO Store operations will be discarded while in the MMIO Stopped State, and MMIO Load operations will get all-1's data returned. The process of error recovery starts with the device driver, e.g., device driver 606, receiving all-1's data back from an MMIO Load operation (step 1404). The device driver 606, not expecting (or not sure if it should expect) all-1's data back, uses the Query VF error state firmware call 710, for example, for the VF 613 to get the VF state information (step 1406). Since the VF 613 is in the error state at this point, the hypervisor 625 may respond to the query that the VF 613 is in the MMIO Stopped and DMA Stopped error state (step 1408). The device driver 606 may use the Query I/O fabric error information firmware call 714, for example, to obtain information about the error registers in the I/O fabric 611, for later problem determination (step 1410). The hypervisor 625 may respond to the query with the error information (step 1412) and the device driver 606 may log the information into an error log for later analysis (step 1414).

The device driver 606 may now be ready to reset its VF and try to restart operations. The device driver 606 may use the reset VF firmware request 708, for example, to reset the VF 613 (step 1416) and the hypervisor 625 may respond to the request with a completion response (step 1418). The device driver 606 may then use the read/write I/O configuration space call 702, for example, to configure its VF 613 (step 1420). The device driver 606 attempts to restart outstanding I/O operations (step 1422) and the operation terminates.

Figure 15:
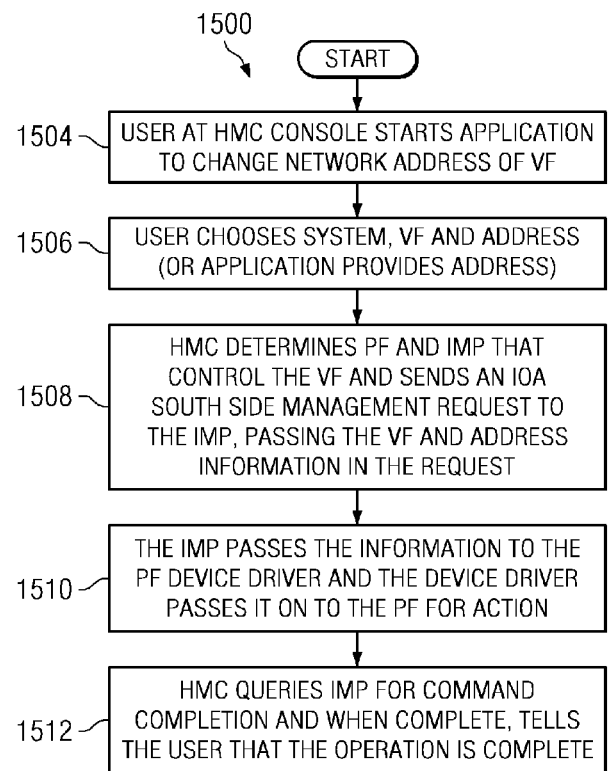
FIG. 15 is a flowchart outlining an exemplary IOA southside management operation for changing a network address on a network adapter in accordance with one illustrative embodiment.

As previously mentioned, an important function of the IMP 603 is to provide secure access to resources of the IOA or endpoint that are either shared across the multiple LPARs that are using the VFs associated with a PF, or are unique to a VF, but which should not be accessible for change by the PF. One example of such a resource of a network I/O adapter (IOA) or endpoint is the network address associated with a PF which is shared by the VFs, or a network address that is unique to a VF. Management of these device-specific resources is referred to as IOA "south side" management of the I/O adapter or endpoint. FIG. 15 is a flowchart outlining an exemplary IOA south-side management operation for changing a network address on a network adapter in accordance with one illustrative embodiment. It should be appreciated that while FIG. 15 is specifically directed to changing a network address on a network adapter, a similar operation may be performed for other resources shared across multiple LPARs that are using the VFs associated with a PF or are unique to a VF.

As shown in FIG. 15, the operation starts with the user at the HMC console 609 starting an application to change the network address for a VF 613 (step 1504). The user may choose the host system 626 or 657, VF 613 and address (or the application may provide the address based on the context of the operation) (step 1506). The HMC 609 may determine the PF 612 and IMP 603 that controls the VF 613 and may send an IOA south side management request 820 to the IMP 603, passing the VF 613 and address information in the IOA south side management request 820 (step 1508). The IMP 603 may pass the information to the PF device driver 605 and the PF device driver 605 may pass it on to the PF 612 for processing (step 1510). The HMC 609 may query the IMP 603 for command completion and when complete, may inform the user that the operation is complete (step 1512) and the operation terminates.

Figure 16:
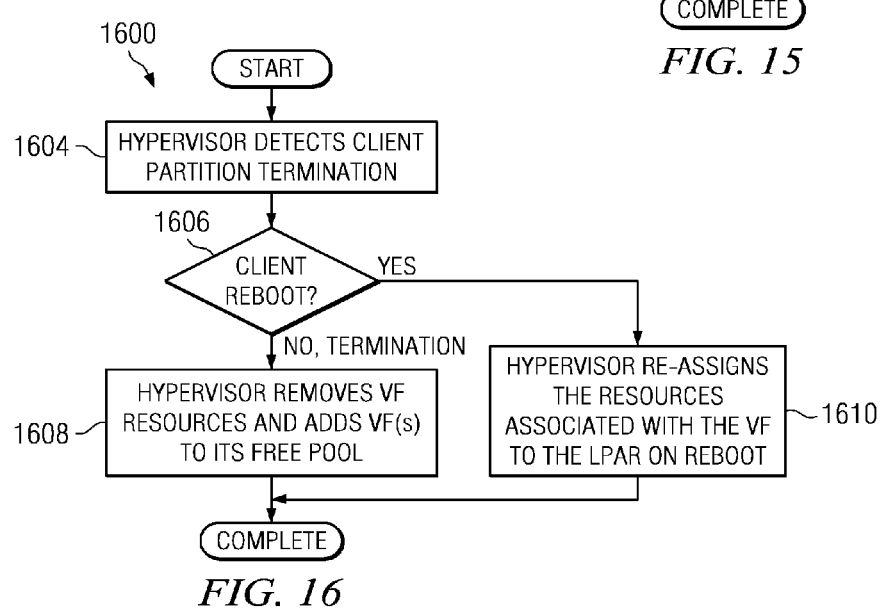
FIG. 16 is a flowchart outlining an exemplary operation for client partition termination in accordance with one illustrative embodiment.

It should be appreciated that the client partitions 604 in the system 601 may terminate operation while the system 601 is operational. There may be many different reasons why a client partition 604 may terminate, such as a non-recoverable error in the software in the client partition or a non-recoverable hardware error that affects only the partition to which that hardware is assigned. FIG. 16 is a flowchart outlining an exemplary operation for client partition termination in accordance with one illustrative embodiment. The operation 1600 outlined in FIG. 16 is directed to a case where the client partition terminates and either reboots or permanently terminates.

As shown in FIG. 16, the operation starts when a client partition 604 terminates for some reason. The hypervisor 625, which can detect when a client partition terminates, for example from a panic call from the partition to the hypervisor due to a non-recoverable software error, or due to a machine check interrupt from the hardware on a non-recoverable hardware error, may detect that the client partition 604 has terminated (step 1604). The hypervisor 625 may then determine if the client partition 604 is set for reboot or not (step 1606), for example as determined from the user's reboot policy set as part of initially setting up the partition.

If the client partition 604 is not set for reboot, the hypervisor 625 may remove the VF resources and add the VF(s) from the terminated partition to the hypervisor VF free pool (step 1608). The fact that it is a termination means that the failing client partition 604 is not going to be rebooted anytime soon and thus, the operation terminates.

If the determination is made that the client partition 604 is to be rebooted (step 1606), then the hypervisor 625 re-assigns the resources associated with the VF(s) in the partition that terminated to the corresponding partition as it is re-booted (step 1610). The operation then terminates.

Figure 17:
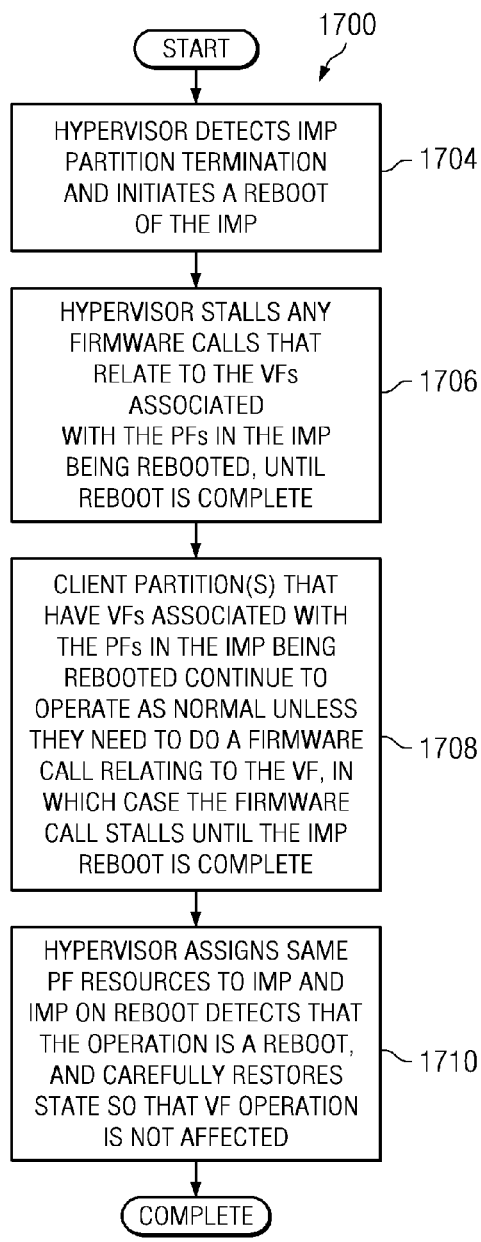
FIG. 17 is a flowchart outlining an exemplary operation for IMP partition termination in accordance with one illustrative embodiment.

It should be appreciated that during operation of the system 601, it is also possible that the IMP 603 may fail. It is expected that the IMP 603 will always be set to reboot if it fails because it is acting as a controller for resources for potentially many VFs 813 in many client partitions 604. FIG. 17 is a flowchart outlining an exemplary operation 1700 for IMP partition termination in accordance with one illustrative embodiment. As shown in FIG. 17, the operation 1700 starts with the IMP partition terminating. The hypervisor 625 may detect the IMP 603 partition termination, for example from a panic call from the partition to the hypervisor due to a non-recoverable software error, or due to a machine check interrupt from the hardware on a non-recoverable hardware error, and initiates a reboot of the IMP 603 (step 1704).

The hypervisor 625 may stall any and all firmware calls 700 for all VF(s) associated with the PF(s) in the IMP 603 being rebooted until the reboot is complete (step 1706) except that the Query interrupt Source firmware call 716 and Setup DMA translation firmware call 718 are not stalled so that normal operations can continue. The client partitions 604 that have VF(s) associated with the PF(s) in the IMP 603 being rebooted continue to operate as normal unless they need to do a firmware call which stalls, in which case the hypervisor 625 stalls the firmware call until the IMP reboot is complete (step 1708). The hypervisor 625 assigns the same PF resources to the IMP 603 and the IMP 603 on reboot detects that he operation is a reboot, and carefully restores state so that VF operations are not affected (step 1710). The operation then terminates.

Figure 18:
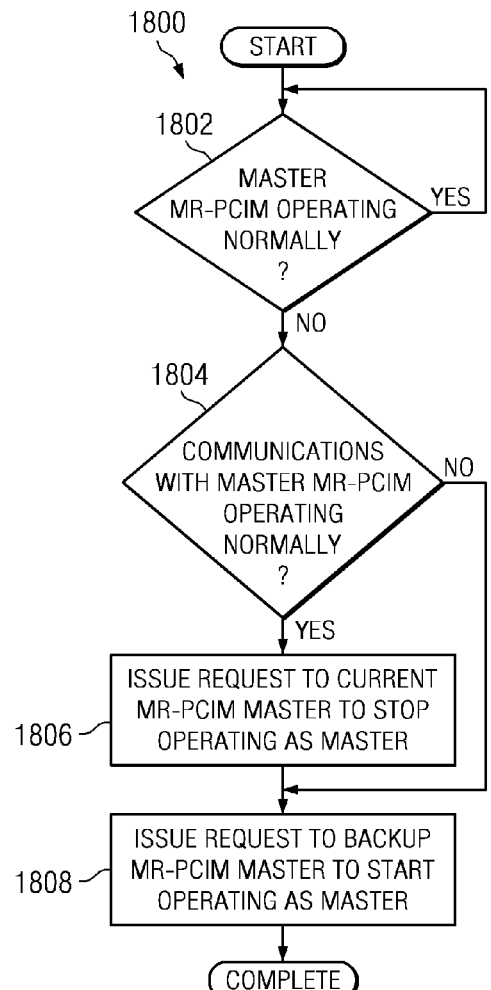
FIG. 18 is a flowchart outlining an exemplary operation for multi-root PCI manager (MR-PCIM) fail-over in accordance with one illustrative embodiment.

In addition, the active MR-PCIM 656 may stop operating properly. This may be due, for example, to the MR-PCIM program itself, the failure of the OS 651 which supports the MR-PCIM, or failure of the MR-IMP 650. In FIG. 6 it is shown that there may be a standby MR-PCIM 658 that may be invoked or enabled when the active MR-PCIM 656 is no longer operating correctly. FIG. 18 depicts the flow to detect the failure of the active MR-PCIM 656 and invoke the standby MR-PCIM 658. The depicted flowchart in FIG. 18 shows the HMC 609 as the coordinator of the failure detection and fail-over operation, but those skilled in the art can appreciate that this process could be performed by other methods, such as communications directly between the various MR-PCIM instances, master MR-PCIM and backup MR-PCIMs, and the determination made directly by the backup MR-PCIM that the master MR-PCIM is not operating normally.

FIG. 18 starts with the test to detect whether or not the master, or active, MR-PCIM 656 is operating correctly (step 1802). The test may be done by use of the query MR-PCIM status request 824 from the HMC 609 to the master MR-PCIM 656, for example. If the determination is made that the master MR-PCIM 656 is operating correctly, then the process loops back to the same step until a failure occurs. When the determination is made that the master MR-PCIM 656 may not be operational (step 1802) then a determination is made as to whether communications with the master MR-PCIM 656 are operational (step 1804), for example by the HMC 609. If communications are operational, then the HMC 609 may issue a request to the master MR-PCIM 656 to terminate operations (step 1806) by using the set new MR-PCIM master request 826, for example. The process then proceeds to issuing a request to the backup, or standby, MR-PCIM 658 to start operating as the master (step 1808) by using the set new MR-PCIM master request 826 from the HMC 609 to the backup MR-PCIM 658, for example. If the determination of communications failure (step 1804), then the process proceeds directly to step 1808 where the backup MR-PCIM 658 is made the master, and the process then completes.

Thus, the illustrative embodiments provide mechanisms that allow the implementation of the MR-PCIM in a separate partition in an already existing system. The embodiments also allow for a backup MR-PCIM to be implemented. Further, the management software for the south-side adapter specific management to be performed in a separate management partition, rather than in the hypervisor, while the adapter-independent operations like configuration and error management are performed by the hypervisor. It is desirable to keep MR-PCIM and I/O adapter dependent code out of the hypervisor to prevent performance impacts to the hypervisor. Moreover, it is desirable to put MR-PCIM and I/O adapter dependent code in a separate management partitions so as to minimize any instability of the hypervisor code due to frequent updates, for example, due to the necessity of updating the code for different adapter-unique south-side management software. Thus, the mechanisms of the illustrative embodiments provide a much more efficient operation of the hypervisor while minimizing instability.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-recordable medium providing program code for use by or in connection with a computer or any instruction execution system. For the purposes of this description, a computer-usable or computer-recordable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device), for example. Examples of a computer-recordable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing input/output virtualization (IOV) management operations, comprising:

creating at least one multiple root I/O virtualization management partition (MR-IMP) in the data processing system, wherein the MR-IMP is a logical partition of the data processing system that is assigned to one or more base functions (BFs) and operates to control multiple-root shared functionality of one or more IOV enabled I/O adaptors via the one or more BFs;

controlling IOV management operations within the data processing system using the at least one MR-IMP, wherein a multiple root I/O virtualization (MR-IOV) manager application of the MR-IMP controls access to the one or more BFs of one or more I/O virtualization enabled I/O adaptors of the data processing system;

creating at least one IOV management partition (IMP) in the data processing system, wherein the IMP is a logical partition of the data processing system that is a separate logical partition from the MR-IMP, and is assigned to the one or more physical functions (PFs) of the one or more IOV enabled I/O adaptors and operates to manage shared resources of the one or more IOV enabled I/O adaptors via the one or more PFs;

creating one or more client partitions on one or more root nodes of the data processing system;

controlling IOV management operations within the data processing system using the at least one IMP, wherein the IMP controls access to one or more physical functions (PFs) of the one or more IOV enabled I/O adaptors, but is not configured to access the BFs of the one or more IOV enabled I/O adaptors; and associating at least one virtual function (VF) of the one or more IOV enabled I/O adaptors with the one or more client partitions, wherein:

the one or more BFs and one or more PFs comprise physical circuit logic in the one or more IOV enabled I/O adaptors that is configurable based on data stored in an associated configuration space in a memory of the one or more IOV enabled I/O adaptors, the at least one VF is a function, within the one or more IOV enabled adaptors, that shares one or more physical adaptor resources, is provided in a sharable resource pool of the IOV enabled adaptor, and is a sink for operations from one or more system images of the data processing system, and the IMP is permitted to perform IOV management operations on the PFs of the one or more IOV enabled I/O adaptors and the one or more client partitions are not permitted to perform IOV management operations on the PFs.

2. The method of claim 1, further comprising:

discovering that an I/O fabric associated with the data processing system is a multiple root (MR) I/O fabric;

booting the MR-IMP in response to discovering that the I/O fabric is an MR I/O fabric such that the MR-IMP executes a MR IOV management application; and configuring, by the MR IOV management application, a MR configuration space using one or more configuration spaces of the base functions of the one or more IOV enabled I/O adaptors.

3. The method of claim 2, further comprising:

reporting, from a hypervisor to a hardware management console (HMC), that the I/O fabric is a MR I/O fabric; and issuing a command from the HMC to the MR IOV management application to query the I/O fabric for MR I/O fabric configuration information.

4. The method of claim 3, wherein if the MR I/O fabric comprises a plurality of MR-IMPs, the HMC selects one MR-IMP to operate as a master MR-IMP and all other MR-IMPs operate as secondary to the master MR-IMP.

5. The method of claim 4, further comprising:

determining if the master MR-IMP is operating properly; and replacing the master MR-IMP with a secondary MR-IMP, which thereafter operates as a master MR-IMP, if the master MR-IMP is determined to not be operating properly.

6. The method of claim 3, wherein configuring a MR configuration space further comprises:

discovering, by the MR IOV management application, a configuration of the MR I/O fabric;

generating MR I/O fabric configuration information based on the discovery of the configuration of the MR I/O fabric, the MR I/O fabric configuration information comprising information regarding the base functions and physical functions of the one or more IOV enabled I/O adaptors; and reporting the MR I/O fabric configuration information to the HMC.

7. The method of claim 6, further comprising:

presenting the MR I/O fabric configuration information to a user via the HMC;

receiving user input indicating which physical functions to assign to which root nodes of the data processing system; and configuring the base functions, via the at least one MR-IMP, based on the assignment of physical functions to root nodes specified in the user input.

8. The method of claim 1, further comprising receiving an input from a hardware management console (HMC) directing performance of the I/O virtualization management operations.

9. The method of claim 8, wherein the input from the HMC is a command to initiate a hot-plug operation for adding a new I/O adaptor to the data processing system, and wherein performing the I/O virtualization management operations comprises:

discovering, by the MR IOV management application, the new I/O adaptor and its associated one or more new base functions and one or more new physical functions; and re-configuring, by the MR IOV management application, the MR configuration space based on the addition of the one or more new base functions and one or more new physical functions.

10. The method of claim 8, wherein the input from the HMC is a command to initiate a hot-plug operation for removing an existing I/O adaptor from the data processing system, and wherein performing the I/O virtualization management operations comprises:

identifying at least one client partition in the one or more client partitions having resources associated with a virtual function of the I/O adaptor to be removed;

removing the virtual function and resources associated with the virtual function from use by the at least one client partition;

removing, from use by the IMP, a physical function and resources associated with the physical function;

removing, from use by the MR-IMP, a base function associated with the I/O adaptor to be removed; and powering down the I/O adaptor to be removed.

11. A computer program product comprising a non-transitory computer useable medium having a computer readable program, wherein the computer readable program, when executed on a data processing system, causes the data processing system to:

create at least one multiple root I/O virtualization management partition (MR-IMP) in the data processing system, wherein the MR-IMP is a logical partition of the data processing system that is assigned to one or more base functions (BFs) and operates to control multiple-root shared functionality of one or more IOV enabled I/O adaptors via the one or more BFs;

control input/output virtualization (IOV) management operations within the data processing system using the at least one MR-IMP, wherein a multiple root I/O virtualization (MR-IOV) manager application of the MR-IMP controls access to the one or more BFs of one or more I/O virtualization (IOV) enabled I/O adaptors of the data processing system;

create at least one IOV management partition (IMP) in the data processing system, wherein the IMP is a logical partition of the data processing system that is a separate logical partition from the MR-IMP, and is assigned to the one or more physical functions (PFs) of the one or more IOV enabled I/O adaptors and operates to manage shared resources of the one or more IOV enabled I/O adaptors via the one or more PFs;

create one or more client partitions on one or more root nodes of the data processing system;

control IOV management operations within the data processing system using the at least one IMP, wherein the IMP controls access to one or more physical functions (PFs) of the one or more IOV enabled I/O adaptors, but is not configured to access the BFs of the one or more IOV enabled I/O adaptors; and associate at least one virtual function (VF) of the one or more IOV enabled I/O adaptors with the one or more client partitions, wherein:

the one or more BFs and one or more PFs comprise physical circuit logic in the one or more IOV enabled I/O adaptors that is configurable based on data stored in an associated configuration space in a memory of the one or more IOV enabled I/O adaptors, the at least one VF is a function, within the one or more IOV enabled adaptors, that shares one or more physical adaptor resources, is provided in a sharable resource pool of the IOV enabled adaptor, and is a sink for operations from one or more system images of the data processing system, and the IMP is permitted to perform IOV management operations on the PFs of the one or more IOV enabled I/O adaptors and the one or more client partitions are not permitted to perform IOV management operations on the PFs.

12. The computer program product of claim 11, wherein the computer readable program further causes the computing device to:

discover that an I/O fabric associated with the data processing system is a multiple root (MR) I/O fabric;

boot the MR-IMP in response to discovering that the I/O fabric is an MR I/O fabric such that the MR-IMP executes a MR IOV management application; and configure, by the MR IOV management application, a MR configuration space using one or more configuration spaces of the base functions of the one or more IOV enabled I/O adaptors.

13. The computer program product of claim 12, wherein the computer readable program further causes the computing device to:

report, from a hypervisor to a hardware management console (HMC), that the I/O fabric is a MR I/O fabric; and issue a command from the HMC to the MR IOV management application to query the I/O fabric for MR I/O fabric configuration information.

14. The computer program product of claim 13, wherein if the MR I/O fabric comprises a plurality of MR-IMPs, the HMC selects one MR-IMP to operate as a master MR-IMP and all other MR-IMPs operate as secondary to the master MR-IMP.

15. The computer program product of claim 14, wherein the computer readable program further causes the computing device to:

determine if the master MR-IMP is operating properly; and replace the master MR-IMP with a secondary MR-IMP, which thereafter operates as a master MR-IMP, if the master MR-IMP is determined to not be operating properly.

16. The computer program product of claim 13, wherein the computer readable program further causes the computing device to configure a MR configuration space further by:

discovering, by the MR IOV management application, a configuration of the MR I/O fabric;

generating MR I/O fabric configuration information based on the discovery of the configuration of the MR I/O fabric, the MR I/O fabric configuration information comprising information regarding the base functions and physical functions of the one or more IOV enabled I/O adaptors; and reporting the MR I/O fabric configuration information to the HMC.

17. The computer program product of claim 16, wherein the computer readable program further causes the computing device to:

present the MR I/O fabric configuration information to a user via the HMC;

receive user input indicating which physical functions to assign to which root nodes of the data processing system; and configure the base functions, via the at least one MR-IMP, based on the assignment of physical functions to root nodes specified in the user input.

18. A data processing system, comprising:

a processor; and a memory coupled to the processor, wherein the memory comprises instructions which, when executed by the processor, cause the processor to:

create at least one multiple root I/O virtualization management partition (MR-IMP) in the data processing system, wherein the MR-IMP is a logical partition of the data processing system that is assigned to one or more base functions (BFs) and operates to control multiple-root shared functionality of one or more IOV enabled I/O adaptors via the one or more BFs;

control input/output virtualization (IOV) management operations within the data processing system using the at least one MR-IMP, wherein a multiple root I/O virtualization (MR-IOV) manager application of the MR-IMP controls access to the one or more BFs of one or more IOV enabled I/O adaptors of the data processing system;

create at least one IOV management partition (IMP) in the data processing system, wherein the IMP is a logical partition of the data processing system that is a separate logical partition from the MR-IMP, and is assigned to the one or more physical functions (PFs) of the one or more IOV enabled I/O adaptors and operates to manage shared resources of the one or more IOV enabled I/O adaptors via the one or more PFs;

create one or more client partitions on one or more root nodes of the data processing system;

control IOV management operations within the data processing system using the at least one IMP, wherein the IMP controls access to one or more physical functions (PFs) of the one or more IOV enabled I/O adaptors, but is not configured to access the BFs of the one or more IOV enabled I/O adaptors; and associate at least one virtual function (VF) of the one or more IOV enabled I/O adaptors with the one or more client partitions, wherein:

the one or more BFs and one or more PFs comprise physical circuit logic in the one or more IOV enabled I/O adaptors that is configurable based on data stored in an associated configuration space in a memory of the one or more IOV enabled I/O adaptors, the at least one VF is a function, within the one or more IOV enabled adaptors, that shares one or more physical adaptor resources, is provided in a sharable resource pool of the IOV enabled adaptor, and is a sink for operations from one or more system images of the data processing system, and the IMP is permitted to perform IOV management operations on the PFs of the one or more IOV enabled I/O adaptors and the one or more client partitions are not permitted to perform I/O virtualization management operations on the PFs.

* * * * *